United States Patent [19]

Iida et al.

[11] Patent Number: 5,440,541
[45] Date of Patent: Aug. 8, 1995

[54] SYSTEM AND METHOD FOR ESTABLISHING COMMUNICATIONS BETWEEN SUBSCRIBERS BASED ON PERSONAL NUMBER ASSIGNED TO EACH SUBSCRIBER

[75] Inventors: Ichiro Iida; Toshihiko Kurita, both of Kawasaki, Japan

[73] Assignee: Fujitsu Limited, Kanagawa, Japan

[21] Appl. No.: 99,163

[22] Filed: Jul. 29, 1993

[30] Foreign Application Priority Data

Dec. 16, 1992 [JP] Japan .................................. 4-336026

[51] Int. Cl.$^6$ .............................................. H04J 3/24
[52] U.S. Cl. ........................... 370/60.1; 370/92; 379/207; 379/57
[58] Field of Search ....................... 370/60, 60.1, 94.1, 370/92, 110.1, 58.1; 340/825.52, 825.47; 379/57, 62, 201, 207, 211, 221, 245, 246

[56] References Cited

U.S. PATENT DOCUMENTS

| | | | |
|---|---|---|---|
| 4,680,785 | 7/1987 | Akiyama et al. | 379/57 |
| 4,752,951 | 6/1988 | Kommeker | 379/57 |
| 4,823,111 | 4/1989 | Tsuchiya et al. | 370/60 |
| 4,864,599 | 9/1989 | Saegusa et al. | 379/62 |
| 4,959,648 | 9/1990 | Breeden et al. | 379/57 |
| 5,117,449 | 5/1992 | Metroka et al. | 379/57 |
| 5,247,571 | 9/1993 | Kay et al. | 379/230 |
| 5,251,248 | 10/1993 | Tokunaga et al. | 379/62 |
| 5,303,285 | 4/1994 | Kerihuel et al. | 379/58 |
| 5,317,621 | 5/1994 | Shibayama | 379/57 |

OTHER PUBLICATIONS

Komura et al., "New Radio Paging System," Jul. 1977, pp. 217–225.

Primary Examiner—Douglas W. Olms
Assistant Examiner—Chau T. Nguyen

[57] ABSTRACT

The present invention aims at realizing a real-time call process by performing a timesaving operation in retrieving personal information in a personal communications system for establishing communications based on a unique personal number assigned to each subscriber. In addition to a unique personal number, each subscriber can be assigned a group number identifying a group to which the subscriber belongs and a local number of the group. For example, if a source subscriber specifies as a destination number the group number+local number of subscriber B, a service control point 11 broadcasts over a network a packet addressed with the group number+local number of subscriber B. Each of the service control points in the network determines whether or not a data base connected to it stores a group number which matches the destination address of the packet. If yes, the packet is received. Then, the associated data base retrieves the personal information associated with the destination address of the received packet, that is, the personal information on subscriber B, and returns to the service control point 11 the packet provided with the personal information on subscriber B. The service control point 11 performs a routing process according to the location information.

21 Claims, 22 Drawing Sheets

| PERSONAL NUMBER | ADDRESS | RECEIVING TERMINAL ADDRESS | TERMINAL ATTRIBUTE | GROUP NUMBER |
|---|---|---|---|---|
| 4378648921 | NW + TERMINAL | NW + TERMINAL | VOICE | GID 1, GID 5 |
| 4378587432 | NW + TERMINAL | NW + TERMINAL | VOICE DATA | GID23 |
| ------------ | ------------ | ------------ | ------------ | ------------ |

Fig. 8

| L-ID | P-ID | LOCA-TION | | Tag |
|---|---|---|---|---|
| ---- | ---- | ---- | | D |
| 100 | A | α | | ---------O |
| | B | β | | |
| | C | β | | |
| | D | γ | | |
| | E | δ | | |
| | F | ε | | |

| L-ID | P-ID | LOCA-TION | | SUBSCRIBER INVOLVED IN LATEST CALL |
|---|---|---|---|---|
| 1 | | | - - - | 4 |
| 4 | | α | | |

| L-ID | P-ID | LOCA-TION | | Tag |
|---|---|---|---|---|
| --- | --- | --- | | |
| 200 | A | α | | 1 |
| | B | β | | 1 |
| | C | γ | | 1 |
| | D | δ | | 0 |

SYSTEM AND METHOD FOR ESTABLISHING COMMUNICATIONS BETWEEN SUBSCRIBERS BASED ON PERSONAL NUMBER ASSIGNED TO EACH SUBSCRIBER

BACKGROUND OF THE INVENTION

1. Field of the Invention

The present invention relates to a personal communication method and system for establishing communications based on a unique personal number assigned to each subscriber.

2. Description of the Prior Art

Recently, personal communications have been more and more popular for their noticeable utility. Personal communications can be established by assigning a unique personal number to each subscriber and specifying by a source subscriber the personal number of a destination subscriber wherever the destination subscriber is when he or she is called.

The personal communications enable a source subscriber to communicate with any destination subscriber wherever the destination subscriber is when he or she is called, thereby guaranteeing personal mobility and realizing communications with any subscriber regardless of the type of network.

To successfully establish personal communications, unique personal numbers and the related location information, etc. should be stored in a data base. However, if personal information is centrally managed in one data base, it takes much time to retrieve target personal information, thus causing difficulty in establishing real-time communications.

Then, a plurality of data bases are assumed to store personal information separately. In this case, target personal information must be easily accessed and retrieved from the right data base. To attain this, a new data base accessing method has been developed by providing a directory server for informing which data base contains the target personal information so that the address of the data base can be retrieved from the directory server.

FIG. 1 shows the access sequence according to which the above described data base accessing method is carried out.

When a subscriber specifies a source identifier (ID) (a personal number of a source subscriber) and a destination ID (a personal number of a destination subscriber), a switching unit first retrieves from a directory server the address of the personal information data base (DB) storing the personal information on the source according to the source ID, and gets information from the data base whether or not the source is registered as a subscriber. Then, it retrieves from the directory server the address of the personal information data base storing the personal information on the destination subscriber according to the destination ID, gets the destination location information from the corresponding data base, and performs a routing process according to the location information.

However, a method of retrieving a data base storing target personal information in the above described directory server requires time for retrieving necessary information in a directory server and a data base. Therefore, with the increasing subscribers and total retrieval time in a directory server, it becomes very difficult to perform real-time call processes.

On the other hand, the noticeable utility pertaining to the personal communications that the communications can be established wherever a destination subscriber is may be the problem for the destination subscriber that the privacy of the destination subscriber can be violated by a call when he or she does not want to accept it, or that the subscriber is subject to a malicious call. Therefore, a countermeasure is demanded to realize call reception control performed by a destination subscriber so that the destination subscriber's undesirable call can be rejected.

Furthermore, with the conventional personal communications, a unique personal number must be assigned to each subscriber in the world. Accordingly, a personal number is represented by not a few digits, and subscribers often get into trouble of memorizing and entering all the digits in making a call.

SUMMARY OF THE INVENTION

The present invention aims admitting a subscriber in communications by assigning group and local IDs to him or her, in addition to a conventional personal ID, both of which can be used to join the corresponding communications.

The present invention also aims at controlling a call reception according to the intention of a destination subscriber.

Furthermore, the present invention aims at realizing a timesaving operation in retrieving personal information so that real-time call processes can be performed.

With the personal communications according to the present invention, each subscriber is assigned, in addition to his or her unique personal ID, a group ID indicating the group the subscriber belongs to and a local ID within the group. A subscriber is permitted to be assigned a plurality of the group IDs. Therefore, a subscriber can establish communications using one of personal and group IDs.

The present invention prepares two types of personal information data bases, that is, personal data bases accessible using a personal ID and group data bases accessible using a group ID. When a source or destination subscriber is specified according to a group ID, personal information is retrieved from a group data base accessible by specified subscribers only, thereby realizing a timesaving operation for the retrieval as compared with the retrieval of specific personal information from a personal data base for storing personal information on all subscribers. Therefore, a connection delay can be minimized throughout the network.

If the group IDs of source subscribers are inputted and stored when the source subscribers are authenticated, then a destination subscriber ID inputting operation can be omitted by adding the group ID of the source subscriber in addition to the local ID of the destination subscriber when the source and destination subscribers belong to the same group.

Furthermore, according to the present invention, a receiving terminal can be specified for each personal ID and group ID. As a result, call reception control can be realized according to the intention of a destination subscriber such that a call from a subscriber in a specific group only can be accepted, and a call with other group IDs or personal IDs can be rejected.

BRIEF DESCRIPTION OF THE DRAWINGS

FIG. 8 shows the configuration of a personal data base;

DESCRIPTION OF THE PREFERRED EMBODIMENTS

Figure 1:
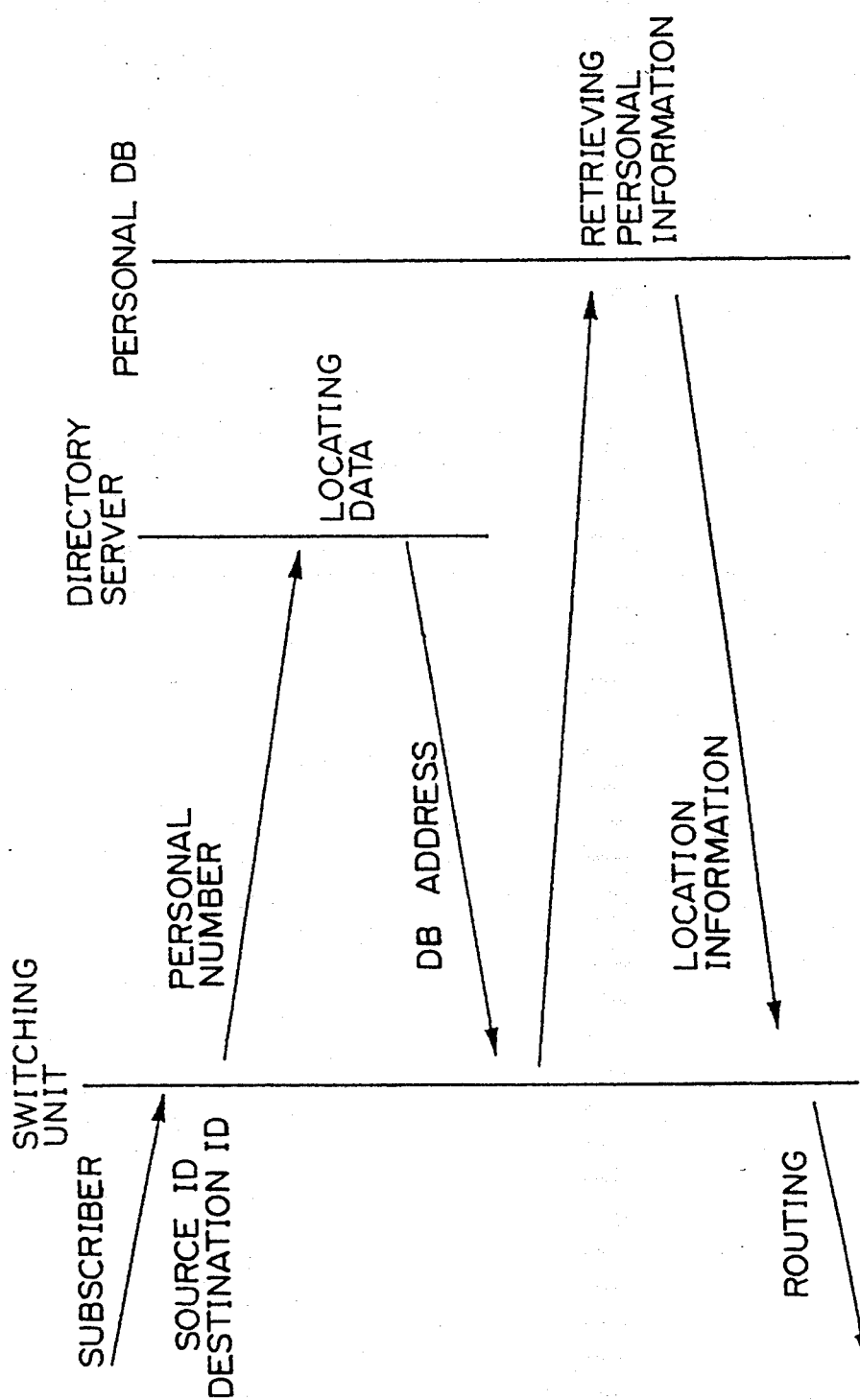
FIG. 1 shows the access sequence prepared for accessing a data base using a directory server.
Figure 2:
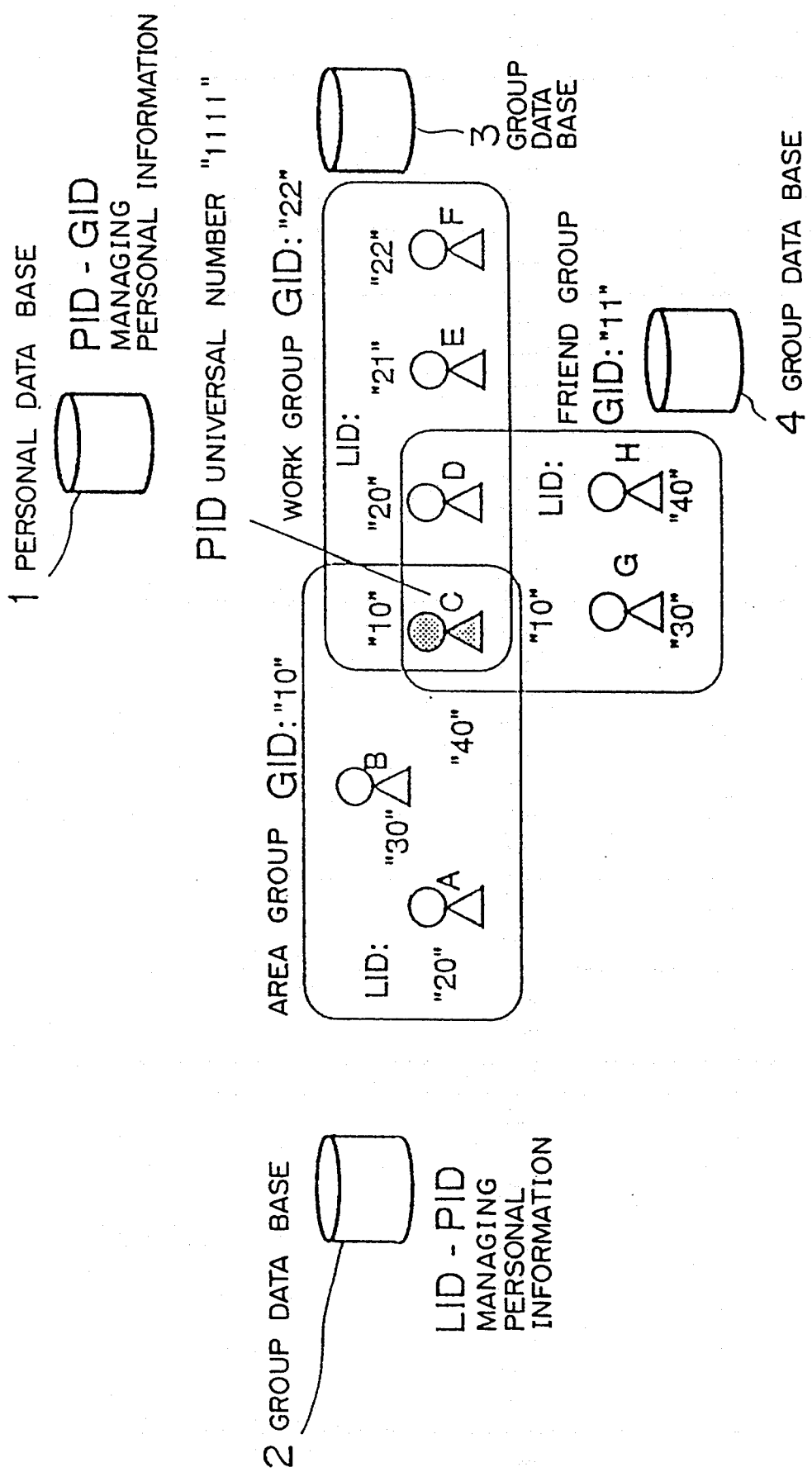
FIG. 2 shows a number to be assigned to each subscriber in the personal communications method according to the embodiment.

The embodiments of the present invention are explained below by referring to the attached drawings. FIG. 2 shows an example of a number to be assigned to each subscriber in the personal communications method according to the present invention.

Each subscriber is assigned a personal ID (a personal number, or a universal number), a group ID indicating the group to which the subscriber belongs (a group number), and a local ID (a local number) within the group. For example, subscriber C belongs to an area group having the group ID "10", a friend group having the group ID "11", and a work group having the group ID "22". In each group, subscriber C is assigned the local number "10". That is, subscriber C is assigned the universal number "1111", the area group+local number (group number+local number) "1010", the friend group+local number (group number+local number) "1110", and the work group+local number (group number+local number) "2210".

The personal information on subscribers A, B, and C is stored in a personal data base 1 and group data bases 2-4. The personal data base 1 stores personal information as associated with each universal number, the area group data base 2 stores personal information as associated with each local number of the area group, the friend group data base 3 stores personal information as associated with each local number of the friend group, and the work group data base 4 stores personal information as associated with each local number of the work group.

Since each subscriber is assigned, in addition to a conventional personal number, the group number of the group to which he or she belongs and the local number in the group, he or she can establish communications with his or her own personal number or a group+local number.

With the numbers assigned as described above, connection delay can be further reduced throughout the network by specifying a source or destination subscriber using a group number than by retrieving specific personal information from a personal data base for storing personal information on all subscribers. That is, retrieving personal information from a group data base accessible by specified subscribers only requires less amount of retrieving processes.

Furthermore, subscribers in a group can communicate with each other by entering only a local number if a group number entered at the authentication of a source subscriber is stored, and a switching unit, etc. has the function of making a call by adding the group number of the source subscriber to the local number of a destination subscriber specified by the source subscriber.

Additionally, if a personal number and a group number are entered such that they refer to more than one piece of location information and each of the personal number and the group number can be accessed at a specified location, then a call from a subscriber of a specified group is received at the specified location and a call from other subscribers is transmitted to another location. Thus, call reception control can be successfully realized according to the intention of a source subscriber.

When a source subscriber is authenticated or the location information of a destination subscriber is retrieved, etc., a packet addressed with a personal number or a group+local number of the source or the destination subscriber respectively is broadcast through a network. If a data base storing a personal number or a group+local number matching the destination address sends through a network the personal information specified by the number, then the personal information can be retrieved within a shorter time with reduced connection delay. The detailed explanation is given later.

Figure 3:
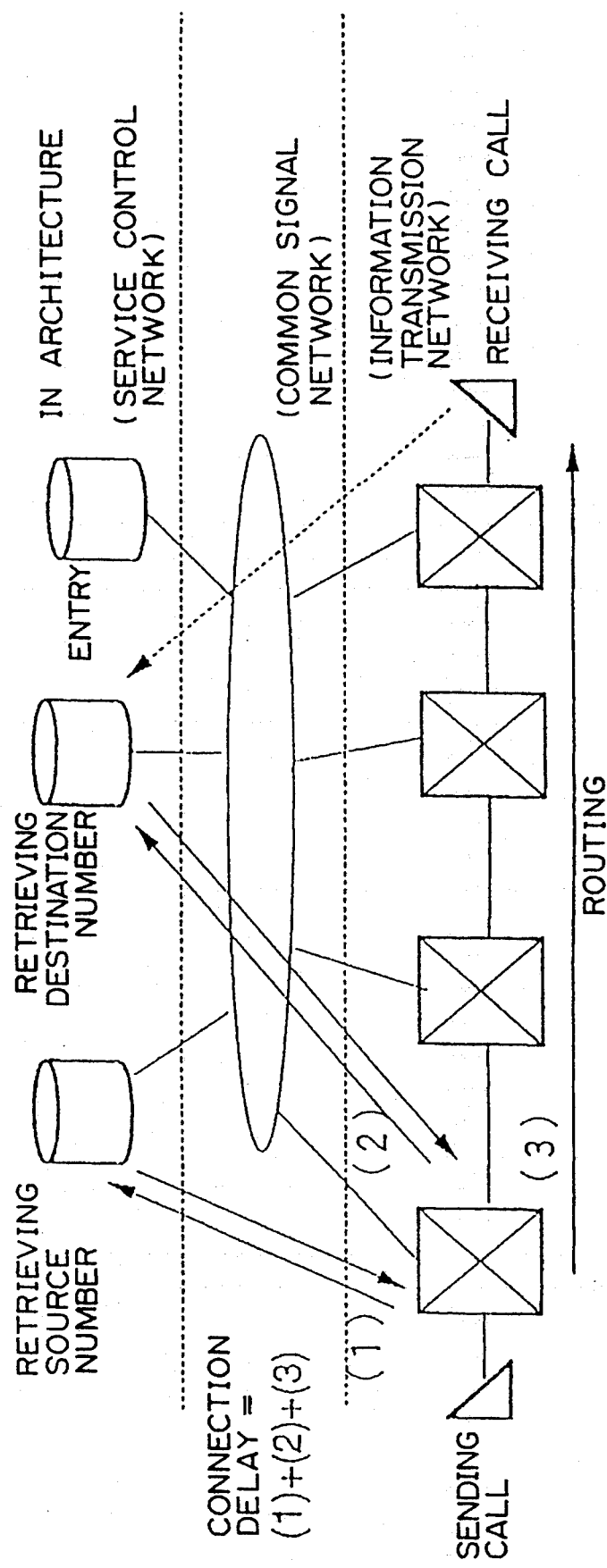
FIG. 3 shows the general configuration of the personal communications system according to the embodiment.

FIG. 3 shows the general configuration of the personal communications system according to an embodiment of the present invention. It shows an example of realizing a personal communications system in an intelligent network.

An intelligent network isolates service control capabilities from a switching unit and centrally manages them, thereby easily adding and modifying a service. It comprises a service control network for performing service control, a common line signal network for transmitting control information, and an information transmission network for performing switch connections. The service control network comprises a data base for storing subscribers' personal information, and a service control point (SCP) for controlling services and managing the data base.

In the personal communications, lines are connected in the order of the authentication of a source subscriber according to the number of a source subscriber ((1) in FIG. 3), the retrieval of location information on a destination subscriber according to the number of a destination subscriber ((2) in FIG. 3), and the routing ((3) in FIG. 3). Accordingly, the total time taken for (1), (2), and (3) is counted as a connection delay.

Figure 4:
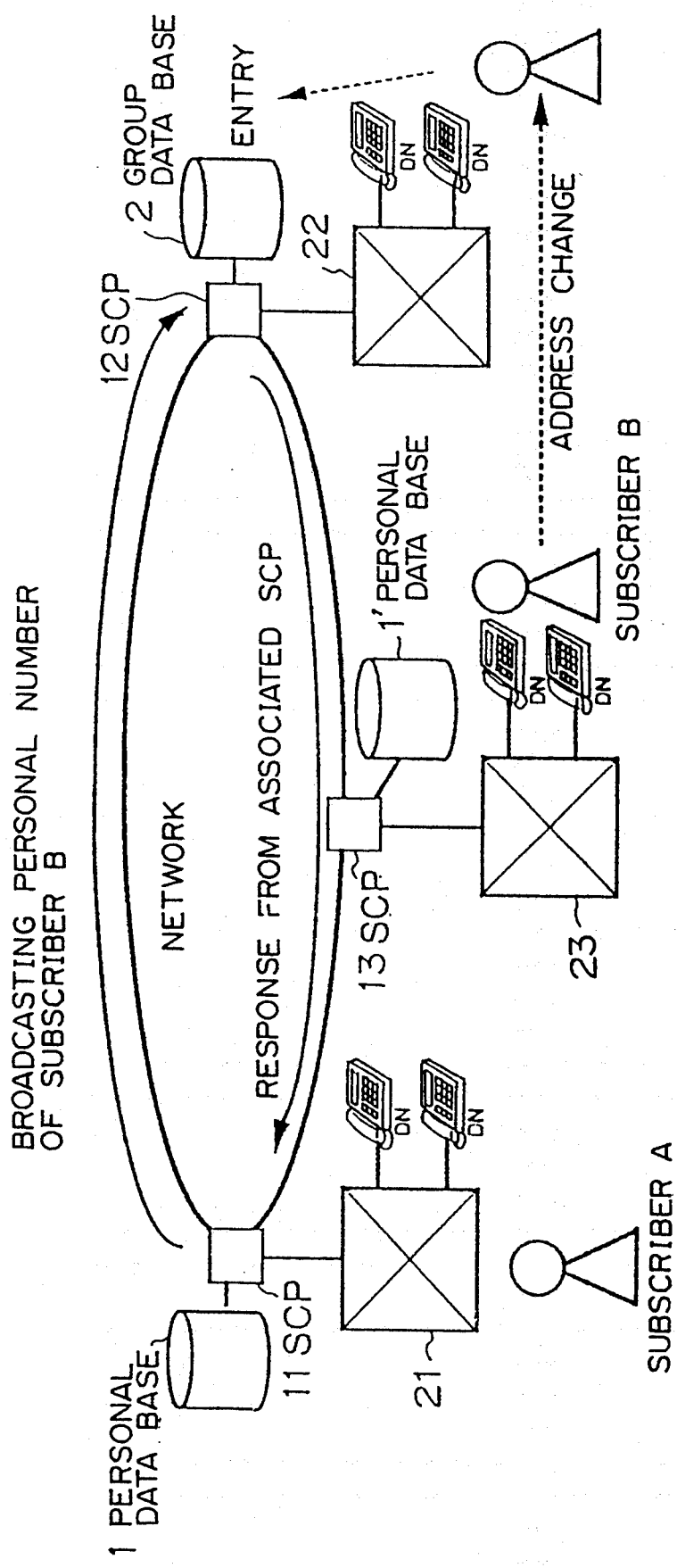
FIG. 4 shows the configuration of a ring-type network system.

FIG. 4 shows the configuration of the system for use in a ring-type service control network. The network is not limited to a ring-type one. It can be formed of anything, for example, a bus-, star-, tree-, and mesh-type network.

In the network, personal data base 1, group data base 2, personal data base 1', . . . are connected through service control points 11, 12, and 13. Furthermore, a plurality of switching units 21, 22, 23, . . . are connected to each of the service control points SCP 11–13.

In personal communications, a subscriber should enter his or her own authenticated number from the present terminal unit when entering his or her location.

Assuming that subscriber B having a location entry for the terminal unit accommodated in switching unit 23 has moved to another terminal unit and entered the new location, a request for the authentication of subscriber B is issued from switching unit 22 accommodating the terminal unit to the nearest service control point 12. To complete the location entry of subscriber B, service control point 12 broadcasts through the network a location entry packet containing the personal number of subscriber B.

Each of the service control points 11–13 in the network determines using an address filtering mechanism described later whether or not the destination address of the packet matches the area number (indicating the home address of a person) or a group number stored in a personal or group data base connected to it. Then, a data base storing the matching number rewrites the location information for the number.

At this time, if the location information on subscriber B has already been entered in personal data base 1', service control point 13 rewrites the location information on subscriber B in personal data base 1', and simultaneously, the location entry packets addressed with the group number of subscriber B are transmitted sequentially. Thus, the location information on subscriber B in the associated group data bases is rewritten.

Consequently, the personal information associated with subscriber B in personal data base 1' and group data bases to which subscriber B belongs is simultaneously rewritten. The process performed at the location entry is explained later.

Then, if subscriber A specifies the personal number (or the group+local number) of subscriber B as a destination number, then service control point 11 broadcasts a packet addressed with the personal number of subscriber B over a network. Each of the service control points in the network determines whether or not the destination address of the packet matches the area number of the personal number or the group number contained in the data bases connected to it. If yes, it receives the packet.

In this case, the personal number of subscriber B is entered in personal data base 1'. Therefore, personal data base 1' retrieves the location information on subscriber B, and service control point 13 transmits the packet having the location information to service control point 11. On receiving the packet containing the location information on subscriber B, service control point 11 routes the call according to the location information.

Figure 5:
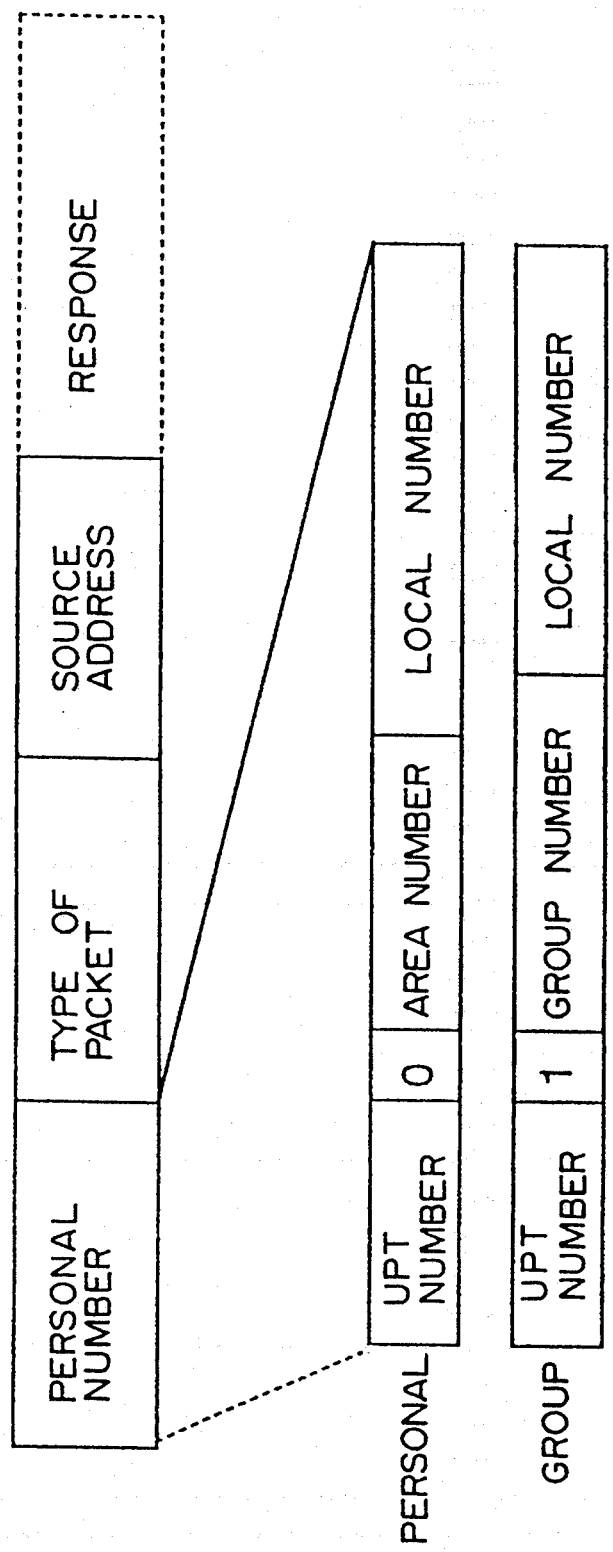
FIG. 5 shows the configuration of a packet.

The configuration of the packet transmitted over a network is explained by referring to FIG. 5. Each packet comprises fields of a personal number, packet type, source address, for controlling a command or a response.

A personal number field stores one identification bit for identifying the present universal personal telecommunications (UPT) number as a personal number or a group number, and an area number (area ID) indicating a home address of the person followed by a local number or a group number followed by a local number. For example, if the identification bit indicates "0", the universal personal telecommunications number refers to a personal number. If the identification bit indicates "1", the universal personal telecommunications number refers to a group number.

Figure 6:
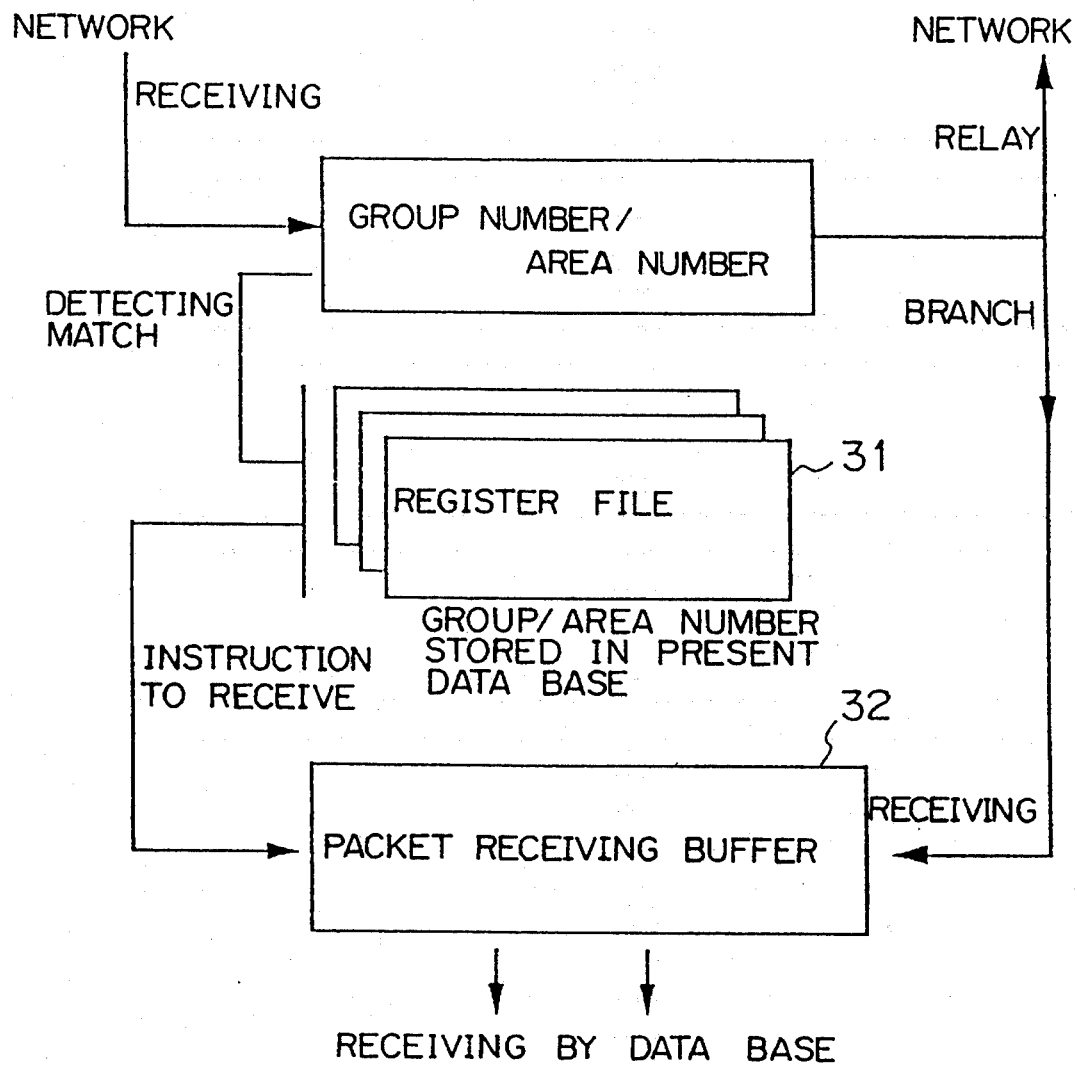
FIG. 6 shows the address filtering mechanism.

FIG. 6 indicates an address filtering mechanism provided before a data base. A register file 31 stores a group number or an area number stored in a data base connected to the file. FIG. 6 shows that a data base stores a plurality of group numbers or area numbers, and the register file 31 stores a plurality of area numbers or group numbers stored in the data base.

On receiving a packet broadcast over a network, the address filtering mechanism first determines whether the universal personal telecommunications number refers to a personal number or a group number according to the identification bit "0" or "1" added to a packet.

If the identification bit indicates "0" referring to a personal number, then a personal data base compares the number preceded by the identification bit with the area number entered in the register file 31 in the address filtering mechanism and determines whether or not a matching number exists. If the identification bit indicates "1" referring to a group number, then a group data base compares the number preceded by the identification bit with the group number entered in the register file 31 and determines whether or not a matching number exists.

If the destination number of the packet matches the number entered in the register file 31, that is, the area number or the group number stored in the data base connected to it, then the packet is received by a packet receiving buffer 32, and a data base access command written in the packet is analyzed.

Figure 7:
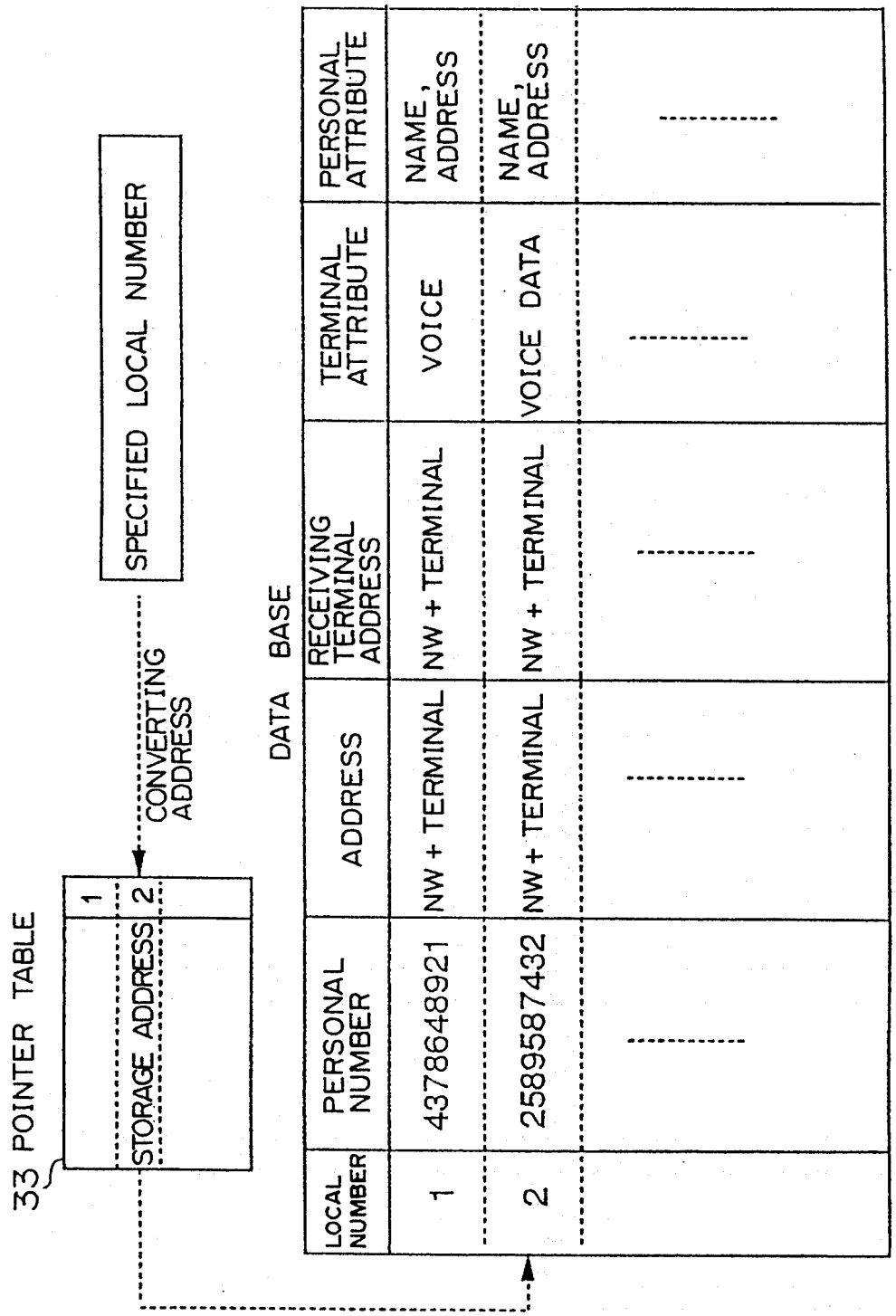
FIG. 7 shows the configuration of a group data base.

The configurations of a group data base and a personal data base are explained by referring to FIGS. 7 and 8.

First, the configuration of a group data base is explained by referring to FIG. 7. As shown in FIG. 7, a storage area of a group data base comprises a field indicating a local number in a group, a field indicating a personal number, a field indicating an address pointing to the present location of a subscriber, a field indicating the receiving terminal address, a field indicating the attributes of the terminal unit informing whether the present terminal unit receives voice only or both voice and data, etc., and a field indicating personal attributes such as a name, address, etc.

If a group data base contains a plurality of group numbers, the address of a specific group in the group data base is specified according to a group number, and an individual address in the specified group is specified according to the above described local number.

An address and a receiving terminal address each comprises a terminal address and a network address at which the terminal unit is accommodated. A receiving terminal address is defaulted to "0". If a receiving terminal address is "0", then the terminal unit identified by an address, that is, the terminal unit whose location is entered by the subscriber is specified as a receiving terminal unit. Each call can be addressed with a telephone number of a subscriber's home, reception number of voice mail, etc. as the receiving terminal address of a friend group, an area group, or a work group individually.

When a subscriber enters a new group, he or she starts a predetermined entry operation through his or her terminal unit, the nearest service control point broadcasts over a network an entry packet assigned a group number, and a corresponding group data base returns unused local numbers to the subscriber. If the subscriber selects one local number and enters his or her password, then the local number is assigned to the subscriber and is entered in the group data base. Afterwards, only supplying his or her password enables the subscriber to access the group data base and send/receive a call.

A pointer table 33 shown in FIG. 7 lists local numbers assigned to services such as a broadcast, a redialing process, etc. as associated with each personal local number in a group data base. It provides various services by specifying local numbers of a plurality of subscribers depending on a desired service.

Next, the configuration of a personal data base is explained by referring to FIG. 8. The storage area of a personal data base comprises a field indicating a personal number, a field indicating an address pointing to the present location of a subscriber, a field indicating the receiving terminal address, a field indicating the attributes of the terminal unit, and a field indicating the group+local number assigned to the subscriber.

That is, a personal number can be obtained as associated with a local number from a group data base, and a group+local number can be obtained as associated with a personal number from a personal data base. Thus, when an address in a data base is changed, all the addresses in the associated data bases can be simultaneously modified by broadcasting over a network a packet, addressed with the associated personal number or group+local number, for changing the specific address.

Figure 9:
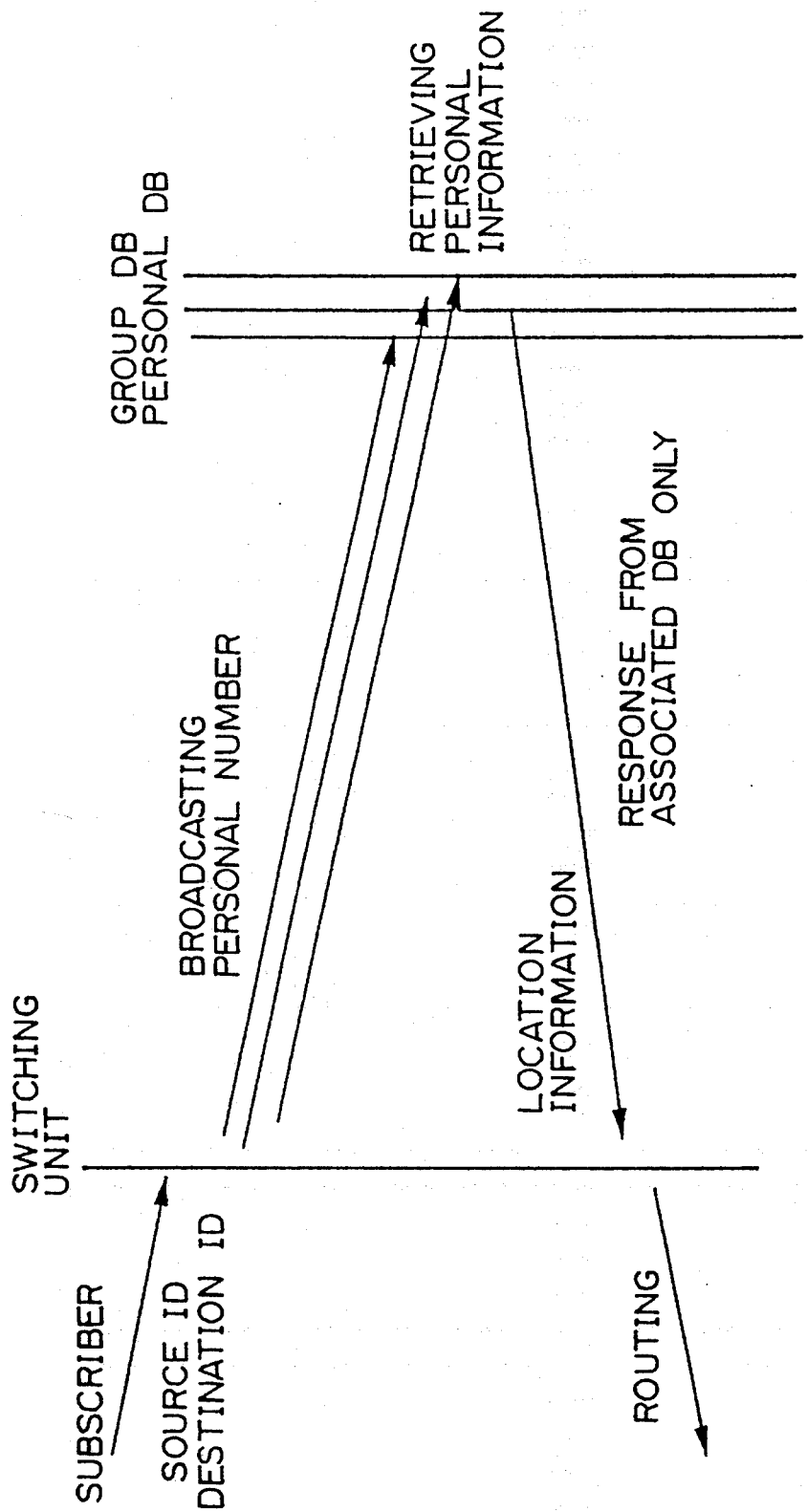
FIG. 9 shows the access sequence prepared for retrieving the location information on a destination subscriber.

The access sequence prepared for retrieving the location information on a destination subscriber is explained by referring to FIG. 9.

When a source ID and a destination ID are specified by a source subscriber, a switching unit broadcasts over a network a packet addressed with a personal number if the destination ID is the personal number. Each data base determines using the above described address filtering mechanism whether or not the destination address of the packet matches the area number of the personal number or the group number in the data base. The data base containing the matching number retrieves the personal number or the group+local number matching the destination address of the packet, obtains the location information stored as associated with the number, and returns the location information to the switching unit accommodating the source subscriber. The switching unit of the source subscriber issues a request for establishing a call to the switching unit accommodating the destination subscriber according to the location information.

Timesaving information retrieval can be realized in a system, in which personal information is distributed and stored in a plurality of personal data bases and group data bases, by broadcasting over a network a packet addressed with a personal number or a group+local number of a source or a destination subscriber and by retrieving and sending over a network a corresponding personal information by a data base for managing the number. Furthermore, real-time call processes can be performed by timesaving information retrieval with reduced connection delay.

Figure 10:
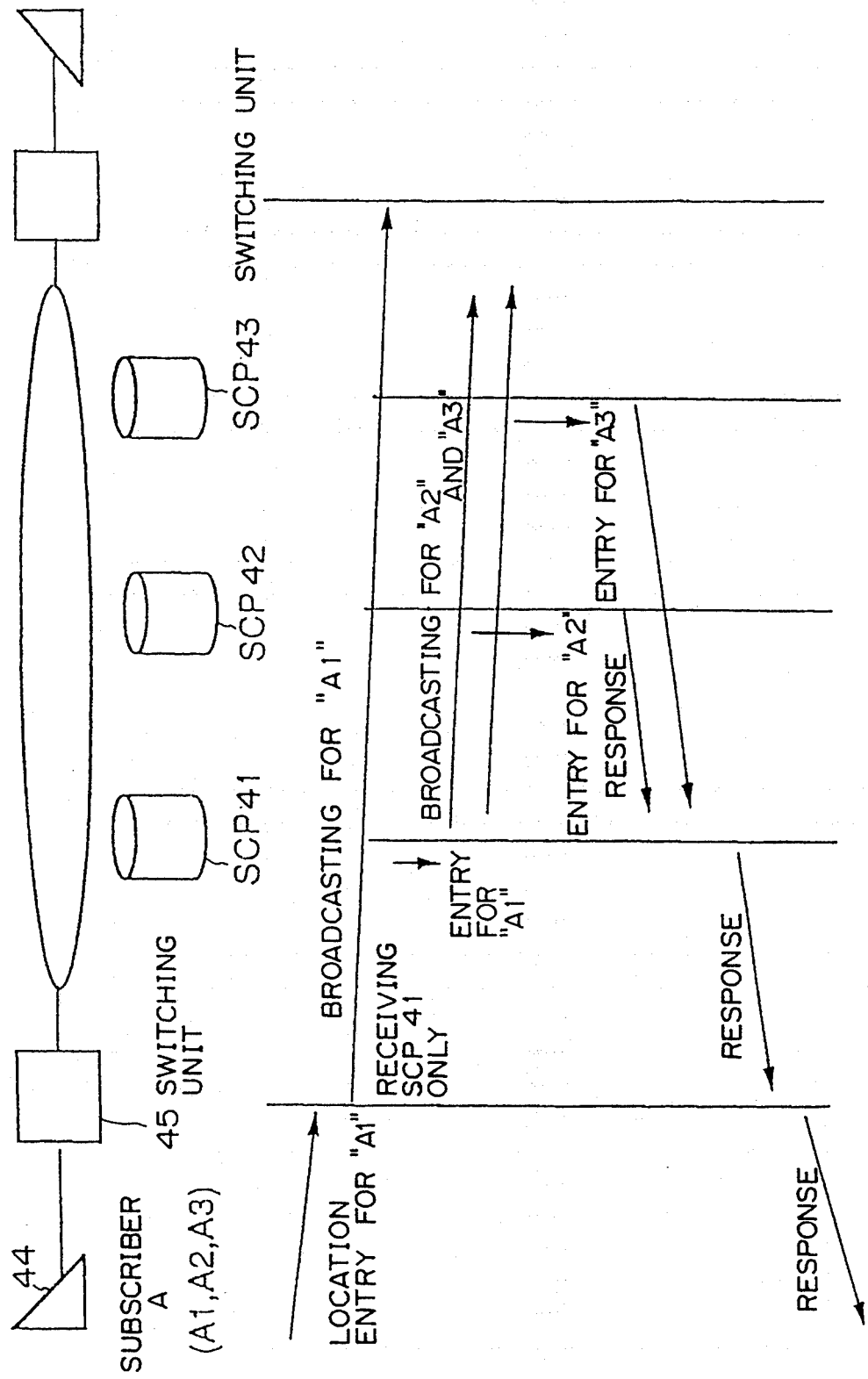
FIG. 10 shows the process sequence in entering a location.

Next, the process sequence for a location entry is described by referring to FIG. 10. Service control points 41 through 43 are connected to a ring-type network. Although not shown in FIG. 10, service control point 41 manages personal data bases, and service control points 42 and 43 manage group data bases respectively.

If subscriber A has entered through terminal unit 44 a personal number A1 as his or her location, switching unit 45 generates a location entry packet addressed with a personal number A1, and the packet is broadcast over a network.

Each of the service control points 41 through 43 determines whether or not the destination address A1 of the packet matches any of the area numbers of personal numbers stored in the data bases connected to it. If yes, it enters the address of terminal unit 44 as the address of the personal number A1. After the entry, service control point 41 checks whether or not subscriber A is assigned any group number by searching the personal information on subscriber A in a personal data base. If subscriber A is assigned group numbers A2 and A3, a location entry packet addressed with A2 and A3 is generated, provided with the address of terminal unit 44, and broadcast over a network.

Service control points 42 and 43 determine whether or not the addresses A2 and A3 of the location entry packet match any of the group numbers in the data bases connected to the service control points. If yes, the location entry packet is successfully delivered.

If the number A2 is stored in a group data base connected to service control point 42, the service control point enters the address of terminal unit 44 as the address of the number A2. If the number A3 is stored in a group data base connected to service control point 43, the service control point enters the address of terminal unit 44 as the address of the number A3.

If the position has been entered, service control points 42 and 43 return a response packet addressed to service control point 41. On receiving the response packets from service control points 42 and 43, service control point 41 determines that the entry has been entered in other data bases, and returns the response packet to switching unit 45. On receiving it, switching unit 45 notifies terminal unit 44 of the completion of the location entry.

Figure 11:
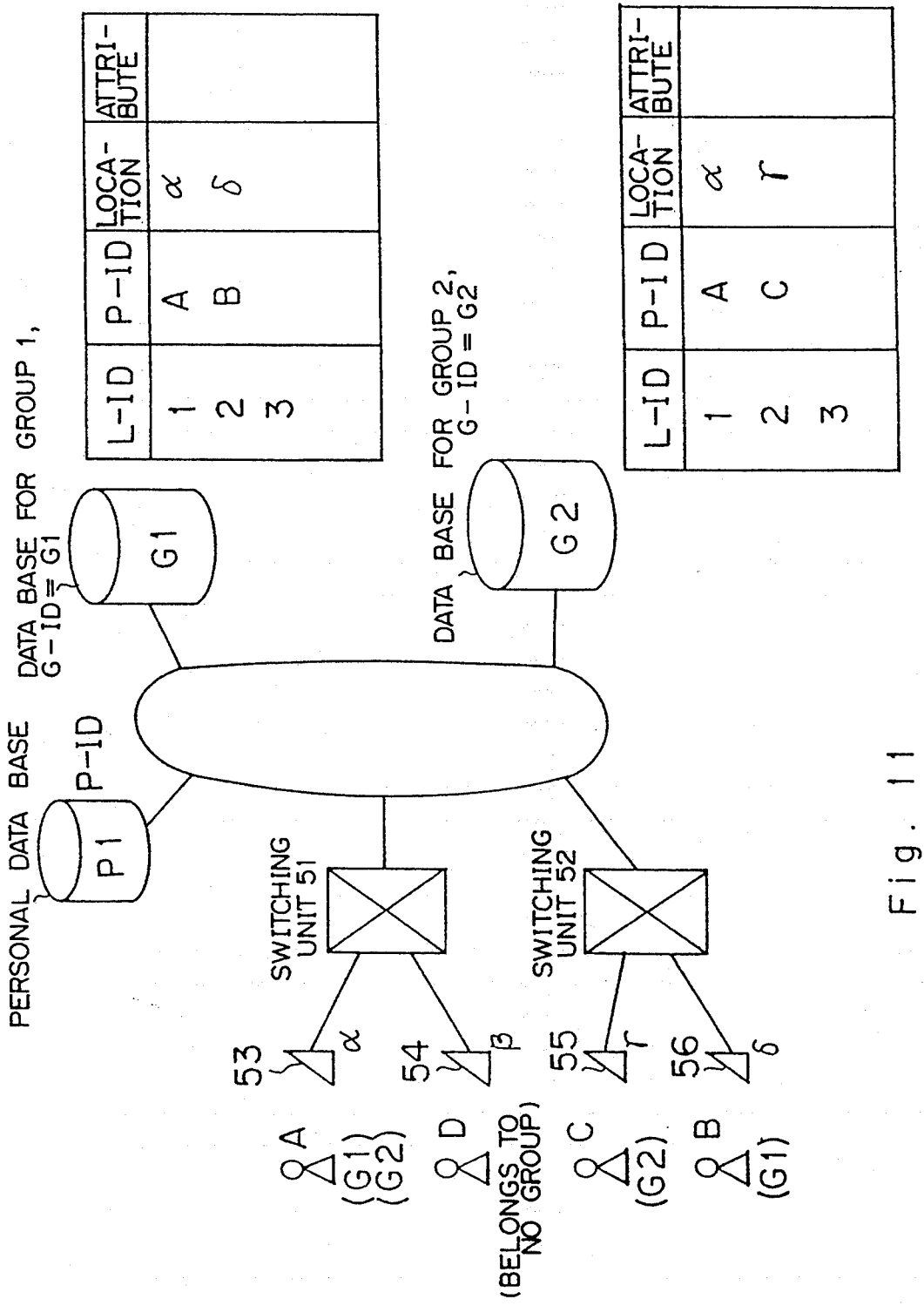
FIG. 11 shows an example of a network system.

Next, FIG. 11 shows an example of a network system in which a personal data base P1 and a plurality of group data bases G1 and G2 are prepared in a network. Assume that subscriber A belongs to groups 1 and 2, subscriber C belongs to group 2, subscriber B belongs to group 1, and subscriber D belongs to no group, and that subscriber A has a location entry in terminal unit 53, subscriber D in terminal unit 54, subscriber C in terminal unit 55, and subscriber B in terminal unit 56.

Though not shown in FIG. 11, personal data base P1 stores location information, terminal attributes, personal attributes, group ID (G-ID) +local ID (L-ID, that is, a local number), etc. as associated with each personal ID (P-ID, that is, a personal number). Group data bases G1 and G2 store personal IDs, location information, attributes, etc. as associated with each local ID as shown in FIG. 11.

For example, data base G1 for group 1 stores the personal ID "A" of subscriber A as associated with the local ID "1" of group 1 to which subscriber A belongs, together with address α of terminal unit 53 as the location information. Likewise, it stores the personal ID "B" of subscriber B as associated with the local ID "2", together with the address 6 of terminal unit 56 as the location information.

Data base G2 for group 2 stores the personal ID "A" of subscriber A as associated with the local ID "1" of group 2 to which subscriber A belongs, together with address a as the location information. It also stores the personal ID "C" of subscriber C as associated with the local ID of subscriber C in group 2 together with the address F of terminal unit 55 as the location information.

Figure 12:
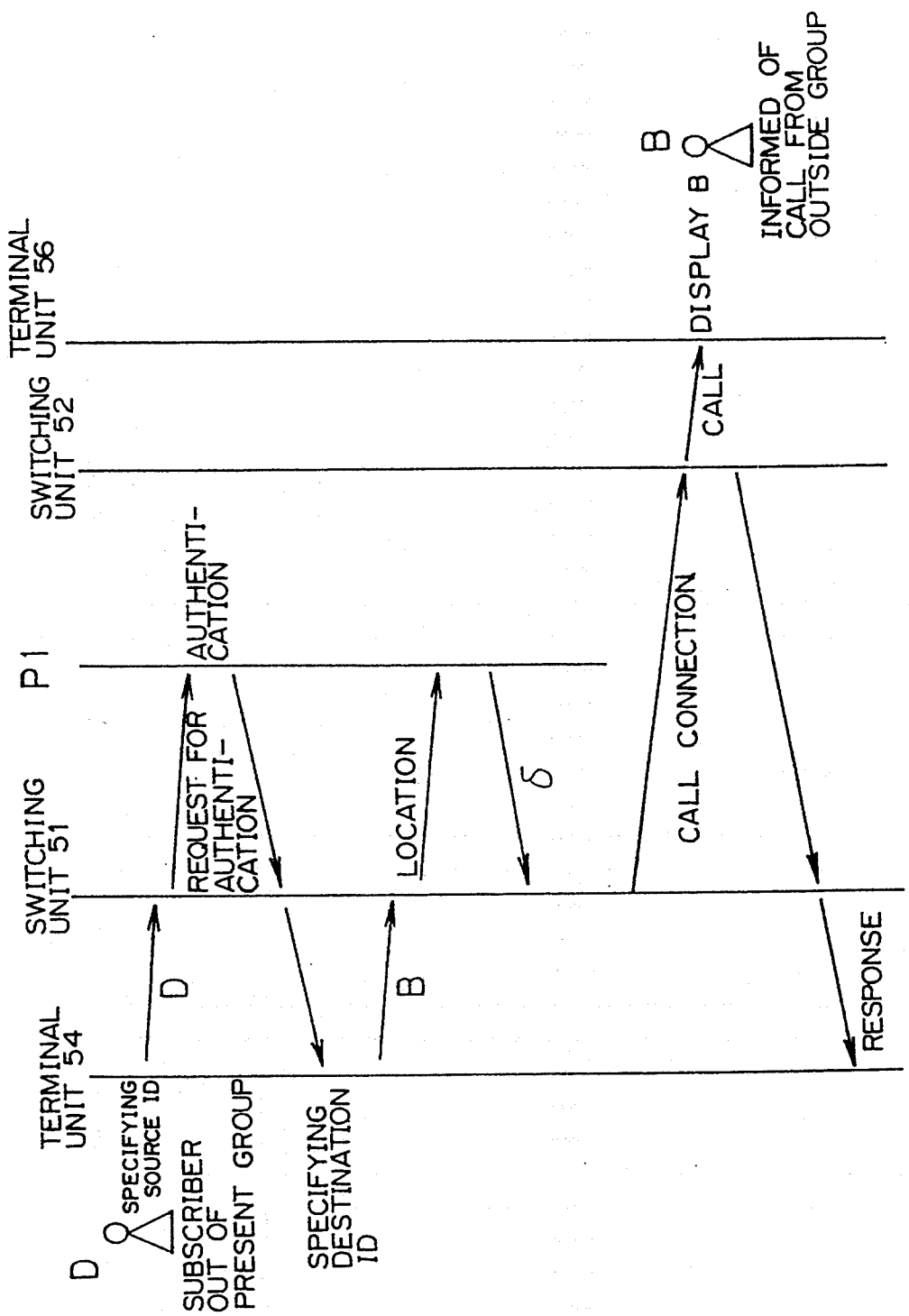
FIG. 12 shows the access sequence prepared for calling a destination subscriber by a personal ID.
Figure 13:
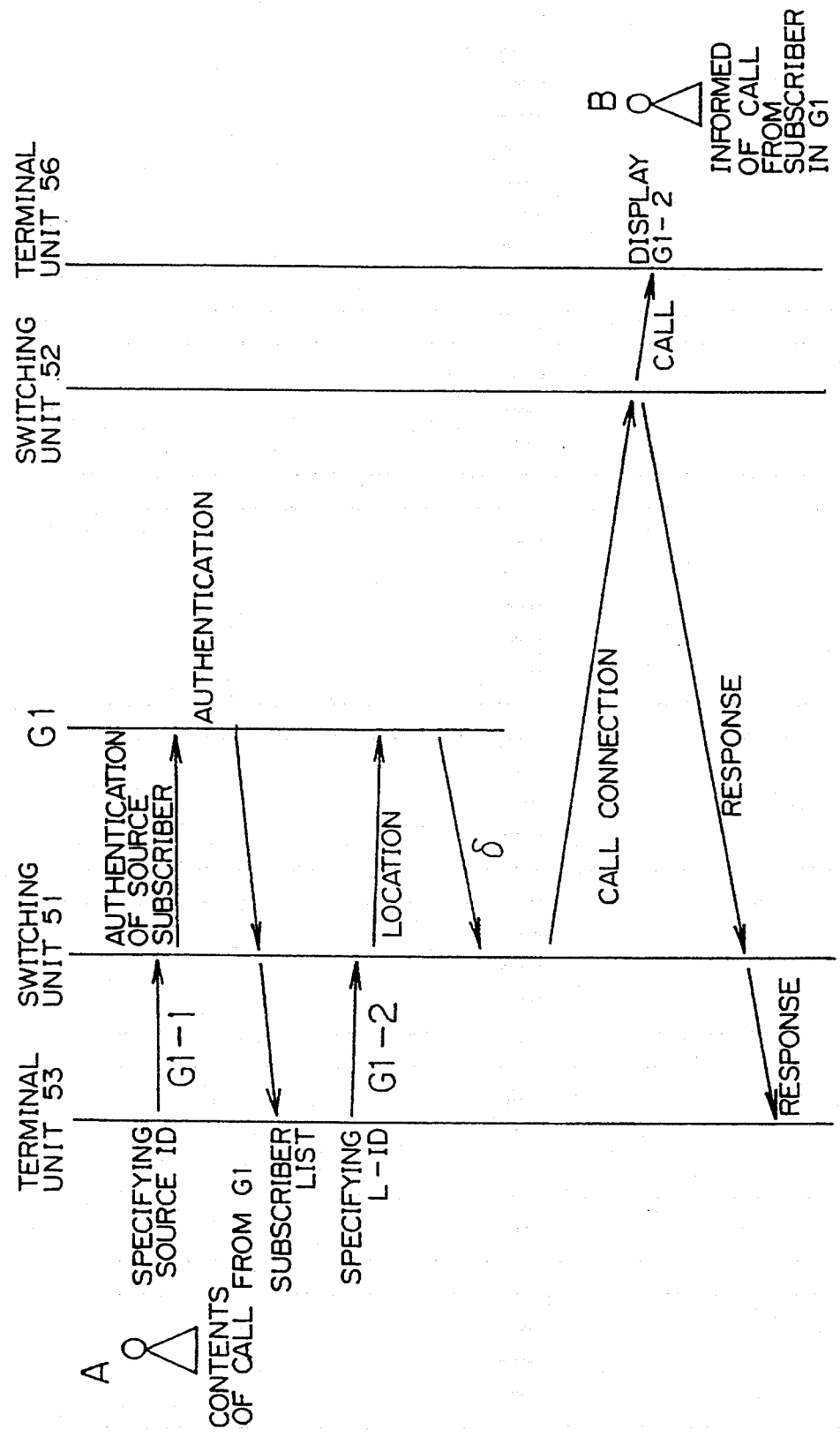
FIG. 13 shows the access sequence (1) prepared for calling a destination subscriber by a local ID.
Figure 14:
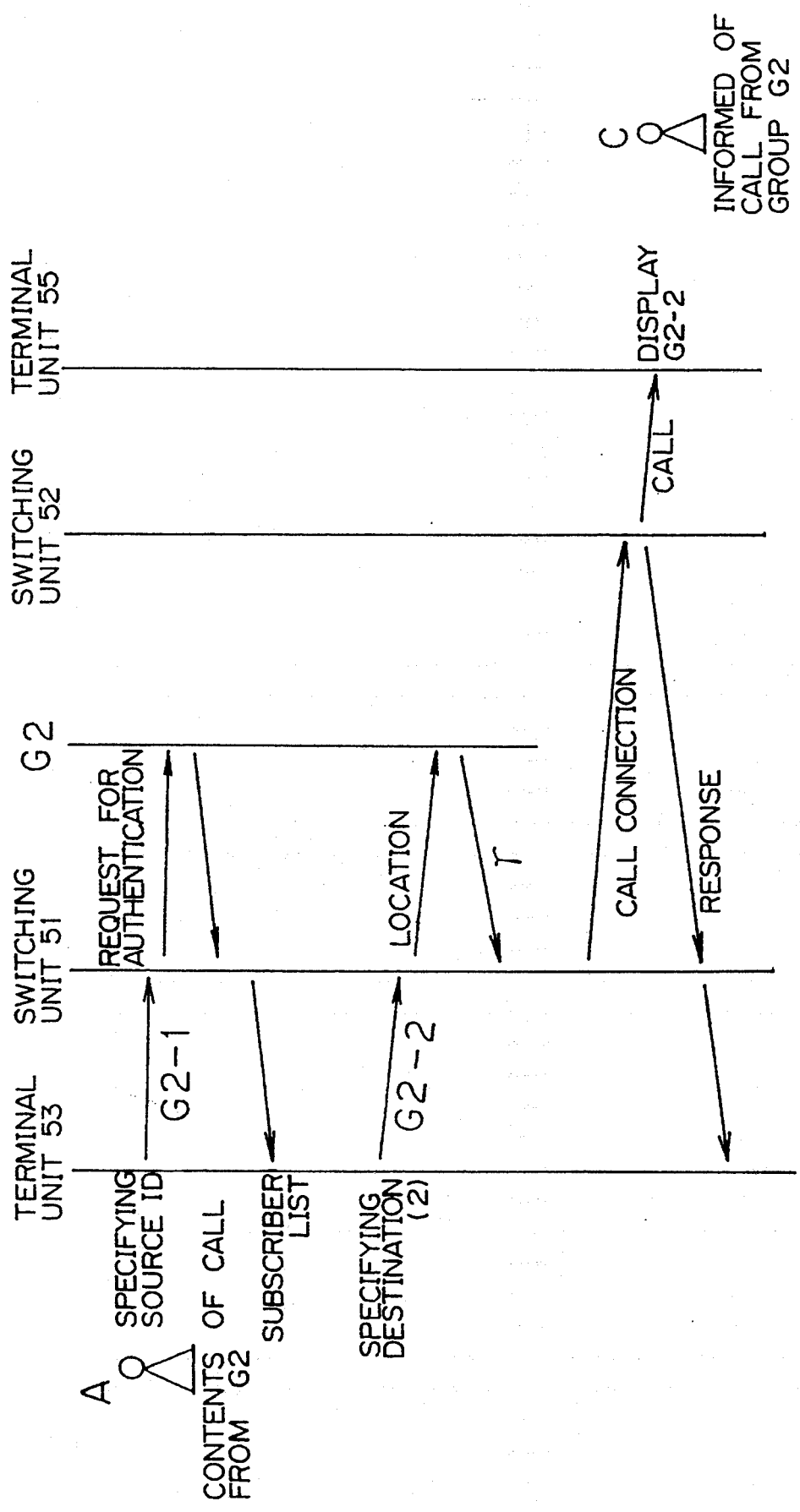
FIG. 14 shows the access sequence (2) prepared for calling a destination subscriber by a local ID.

Next, with the above described data .base, the access sequences by a personal ID and a local ID are explained by referring to FIGS. 12 through 14.

First, the access sequence for subscriber D who belongs to no groups to call subscriber B by a personal ID is explained by referring to FIG. 12.

Subscriber D enters a source subscriber ID by operating ten keys on terminal unit 54 or by an IC card storing his or her own source ID an authenticated number, etc. If the source subscriber ID has been entered, switching unit 51 accommodating terminal unit 54 broadcasts over a network a packet addressed with the personal ID of subscriber D to authenticate the source subscriber D. When a corresponding personal data base P1 returns a response that it has an entry of the personal ID of subscriber D, switching unit 51 notifies that terminal unit 54 is permitted to issue a call.

Next, if subscriber D has entered the personal ID "B" of destination subscriber B, then switching unit 51 broadcasts over a network a packet addressed with the personal ID "B" of subscriber B. Then, if the address δ of subscriber B is returned by personal data base P1, then switching unit 51 requests, according to the address δ, switching unit 52 accommodating terminal unit 56 in which subscriber B has a location entry to set a call.

In response to the request, switching unit 52 calls terminal unit 56. At this time, terminal unit 56 displays on its display unit the personal number "B" of subscriber B specified by the source subscriber. Thus, subscriber B is informed through the display unit that the call is made by the personal number of a subscriber outside the group before answering the call.

Then, the access sequence for subscriber A in group 1 to call subscriber B in the group with a local ID is explained by referring to FIG. 13.

When a call is made within group 1, subscriber A enters as a source ID "G1-1" representing a group ID +local ID of group 1 at the authentication of a source subscriber. Switching unit 51 broadcasts over a network a packet addressed with "G1-1" for the authentication of the source subscriber. Each data base in the network determines whether or not the source subscriber matches any of the IDs stored in itself. At this time, since data base G1 for group 1 has an entry of the local ID "1", group data base G1 returns a response packet informing that it has an entry of the source subscriber ID.

Next, if subscriber A has entered the local ID "2" of destination subscriber B, switching unit 51 broadcasts over a network a packet addressed with "G1-2" represented by the local ID "2" followed by the group ID of the source subscriber "G1" to instruct each data base in the network to retrieve the location information on subscriber B.

Thus, when a source subscriber is calling another subscriber within a group, he or she should enter his or her group ID at the source subscriber authentication. Then, next time the source subscriber calls a destination subscriber in the group, the source subscriber only has to enter the local number of a destination subscriber when entering the destination subscriber ID. Thus, a timesaving entry can be realized by simplifying the conventional entry of a whole personal number.

If a call is made by a local ID, the number of subscribers entered in a target group data base is limited. Therefore, the amount of retrieval processes and the connection delay can be sufficiently reduced.

When the address δ of subscriber B has been returned by group data base G1, then switching unit 51 requests, according to the address δ, switching unit 52 accommodating terminal unit 56 in which subscriber B has a location entry to set a call.

In response to the request, switching unit 52 calls terminal unit 56 having the location entry of subscriber B. At this time, terminal unit 56 displays on its display unit the group ID+local ID "G1-2" of subscriber B specified by the source subscriber. Thus, subscriber B is informed through the display unit that the call is made by a subscriber within group 1 before answering the call. What is displayed as a destination ID on terminal unit 26 can be a group name instead of a group number.

FIG. 14 shows the access sequence prepared when a call is made by a local ID as in FIG. 13. It shows the case when subscriber A is calling subscriber C by local ID within group 2.

When a call is made within group 2, subscriber A enters "G2-1" representing a group ID of group 2+his or her local ID "1" at the authentication of a source subscriber. Switching unit 51 broadcasts over a network a packet addressed with "G2-1" for the authentication of the source subscriber.

If subscriber A has entered the local ID "2" of destination subscriber after the authentication of the source subscriber, switching unit 51 adds to the local ID "2" the group ID "G2" entered at the authentication of the source subscriber to broadcast over a network the packet addressed with "G2-2".

If data base G2 has returned the address Γ of the subscriber having the local ID "2", switching unit 51 requests switching unit 52, accommodating terminal unit 55 in which subscriber C has an entry of his or her position by the address Γ, to set a call. At this time, the display unit of destination terminal unit 55 displays the ID "G2-2" of subscriber C specified by the source subscriber, subscriber C can be informed through the display unit that he or she has a call from a subscriber within group 2 before answering the call.

Next, explained below are the access sequences prepared for making a broadcast call to a plurality of subscribers by a specific local number within a group, for redialing the number of the subscriber involved in the latest call, and for making a multipoint connection.

Figure 15:
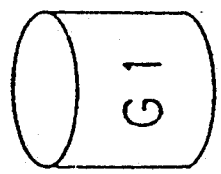
FIG. 15 shows the configuration of a group data base for realizing a broadcast.

First, the configuration of the data base for realizing a broadcast call is explained by referring to FIG. 15. In the embodiment, a specific local ID of group data base G1, for example, the local ID "100" is assigned a communication mode for a broadcast call. Then, personal IDs, addresses, tags, etc. of a plurality of subscribers A, B, C, D, E, and F are stored as associated with each local ID. Tags are usually set to "1", and the tag of the last subscriber entered for the local ID "100" is set to 0.

Figure 16:
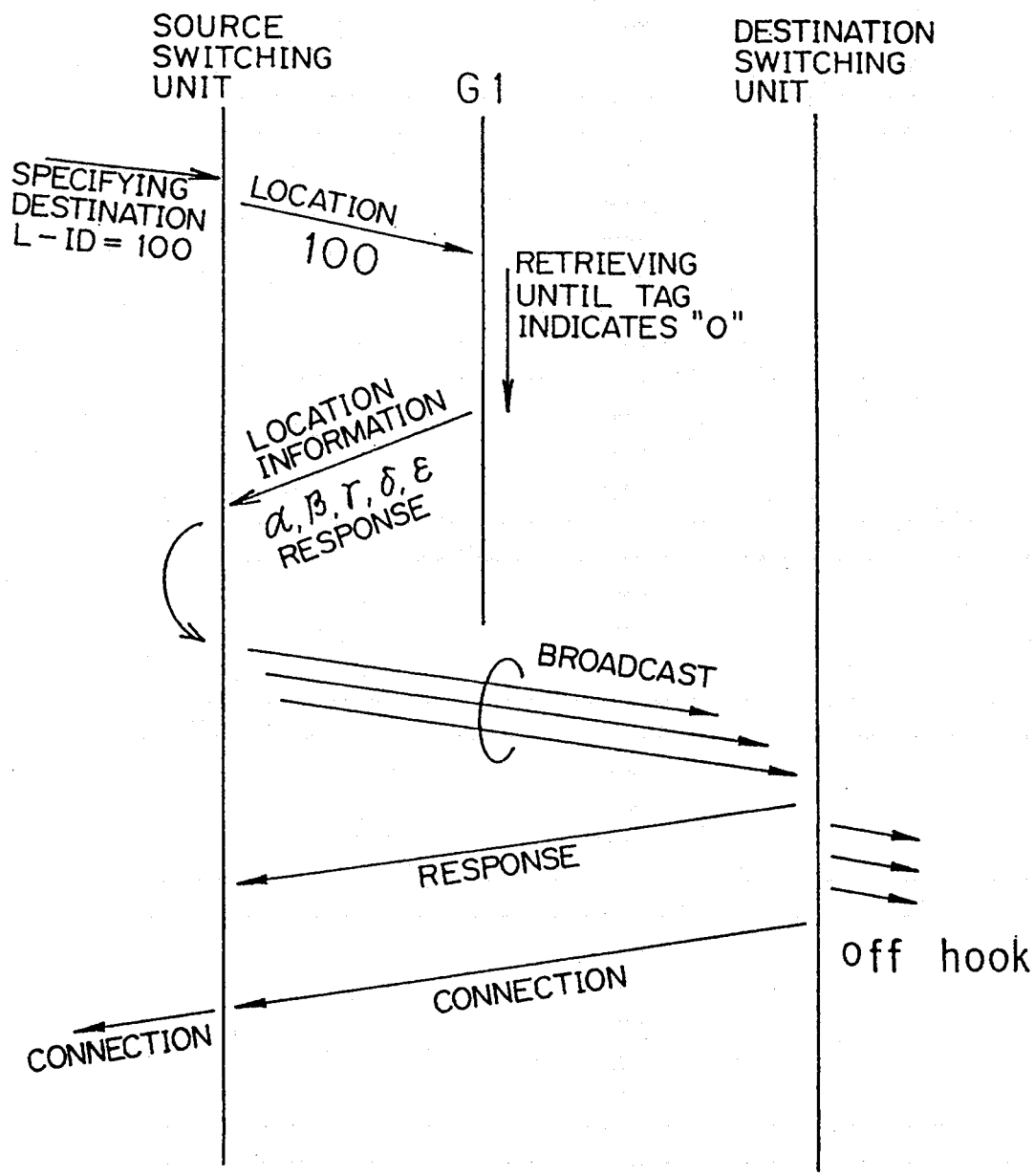
FIG. 16 shows the access sequence prepared for performing a broadcast.

Next, the access sequence prepared for making a broadcast call is explained by referring to FIG. 16. When a broadcast call is performed, a subscriber specifies "100" as a destination ID. Then, a source switching unit accommodating the source subscriber broadcasts over a network a packet addressed with "G1-100" represented by the specified local ID followed by the group ID "G1" specified at the authentication of a source subscriber, thereby instructing the retrieval of location information.

On receiving the packet addressed with "G1-100", associated group data base G1 retrieves the location information $\alpha$, $\beta$, $\Gamma$, ... of each subscriber entered for the local ID "100" in the data base until the tag indicates "0", and then the retrieved location information is returned to the source switching unit.

According to the location information $\alpha$, $\beta$, $\Gamma$, ..., the source switching unit sends to a destination switching unit a request for setting a call to subscribers A, B, C, .... The destination switching unit makes a broadcast call to the terminal units in which subscribers A, B, C, ... have an entry of their locations, and sends a call setting notification to the source subscriber when the terminal units are hooked off. Actually, a call is established to the first destination terminal unit to hook off among the destination terminal units which received the broadcast call.

Thus, a communication mode can be set to make a broadcast call to a plurality of subscribers in a group by entering the personal IDs, location information, etc. of a plurality of subscribers for a specific local ID in a group data base.

Figure 17:
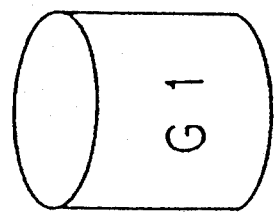
FIG. 17 shows the configuration of a group data base for redialing the number of the destination subscriber involved in the latest call.

Explained below by referring to FIG. 17 is the configuration of the data base for redialing the number of a subscriber involved in the latest call. In the embodiment, a field is provided to store a local ID of a subscriber involved in the latest call as associated with each local ID in group data base G1. The field stores the subscriber involved in the latest call within the group.

Figure 18:
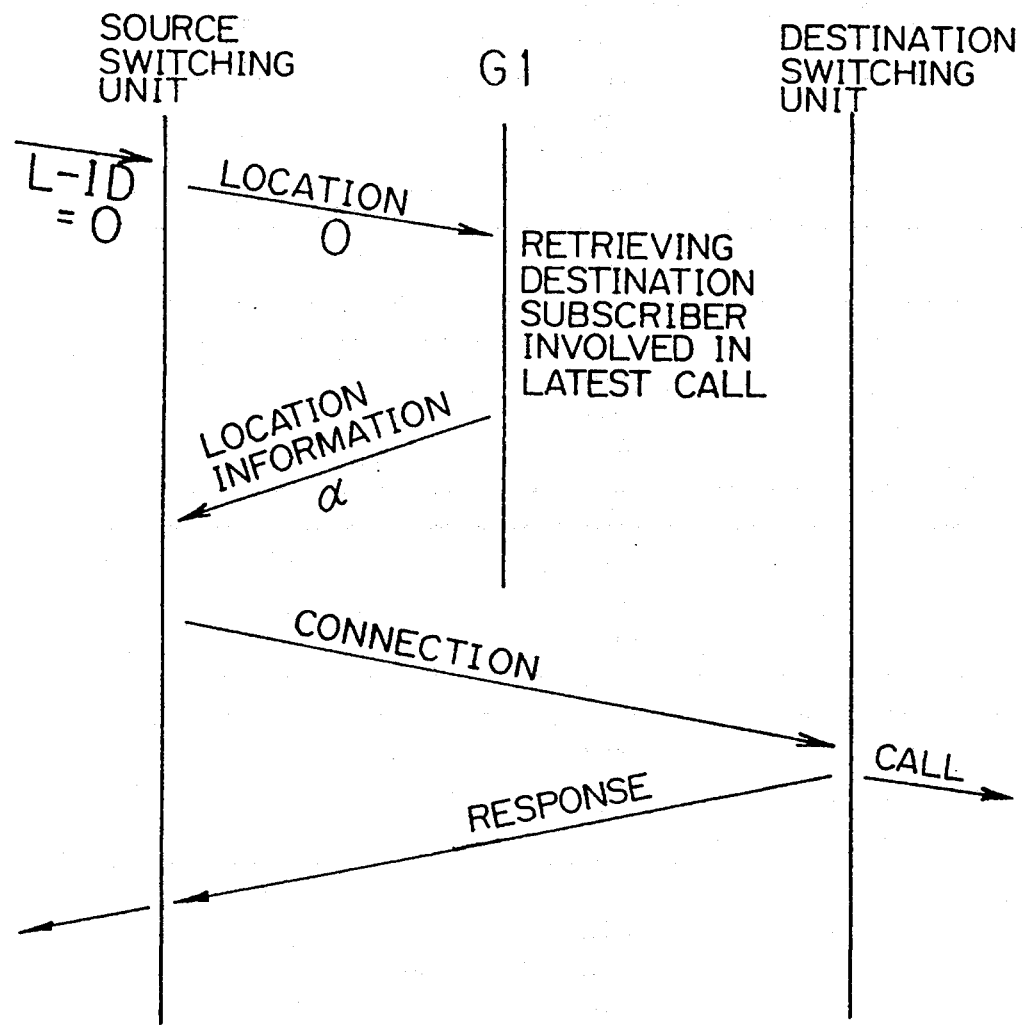
FIG. 18 shows the access sequence prepared for redialing the number of the destination subscriber in the latest call.

Described below by referring to FIG. 18 is the access sequence prepared for redialing the number of a subscriber involved in the latest call using the above described data base.

Assume that a specific local ID, for example, the local ID "0", is assigned to a service of redialing the number of a subscriber involved in the latest call.

If the group ID "G1" is specified at the authentication and the local ID "0" is specified as a destination ID, then a source switching unit sends over a network a packet addressed with "G1-0" represented by the local ID "0" followed by the group ID "G1". On receiving the packet addressed with the local ID "0", group data base G1 retrieves from itself according to the source ID contained in the packet the local ID of the subscriber involved in the latest call from the associated source subscriber, and then obtains the location information on the subscriber involved in the latest call according to the local ID.

For example, the local ID "4" of the subscriber involved in the latest call from the source subscriber ID "1" is retrieved from the group data base shown in FIG. 17 and the location information $\alpha$ of the subscriber having the local ID "4" is obtained when the subscriber having the local ID "1" specifies "0" as a destination subscriber ID.

The source switching unit performs a routing process according to the location information $\alpha$, and requests the destination switching unit accommodating the destination terminal unit to set a call. The destination switching unit calls the terminal unit having the location information $\alpha$.

In the embodiment, only designating a specific local ID redials the number of the subscriber involved in the latest call, thereby realizing a redialing service within a group.

Figure 19:
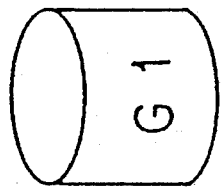
FIG. 19 shows the configuration of a group data base for realizing a multipoint connection.

Next, the configuration of a group data base for realizing a multipoint connection is explained by referring to FIG. 19. In the embodiment, a multipoint connection communication mode is assigned to a specific local ID in group data base G1, for example, the local ID "200". Personal IDs, addresses, tags, etc. of a plurality of subscribers A, B, C, and D are stored as associated with the local ID. Normally, a tag is set to "1", and the tag of the last subscriber entered for the local ID "200" is set to "0".

Figure 20:
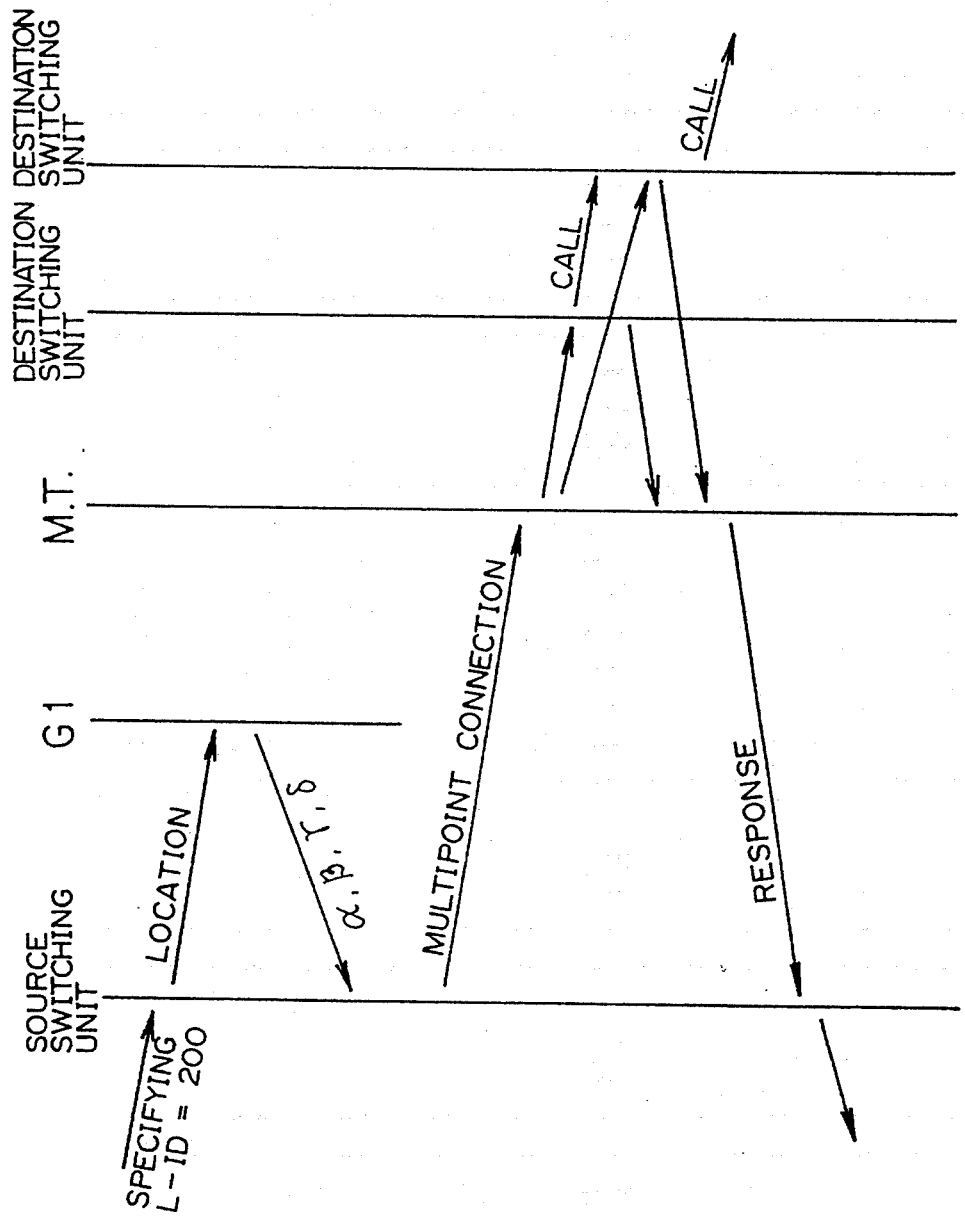
FIG. 20 shows the access sequence prepared for performing a multipoint connection.

Explained below by referring to FIG. 20 is the access sequence prepared for making a multipoint connection using the above described data base.

When a multipoint connection is made, a subscriber specifies, for example, "200" as a destination ID. Then, a source switching unit accommodating the source subscriber broadcasts over a network a packet addressed with "G1-200" represented by the specified local ID followed by the group ID "G1" specified at the authentication of a source subscriber, and instructs the retrieval of location information.

On receiving the packet addressed with "G1-200", group data base G1 retrieves the location information $\alpha$, $\beta$, $\Gamma$, ... of each subscriber entered for the local ID "200" in the data base until the tag indicates "0", and then the retrieved location information is returned to the source switching unit.

According to the location information $\alpha$, $\beta$, $\Gamma$, ..., the source switching unit performs a routing process and requests destination switching units accommodating subscribers A, B, C, ... to set a call through a mixing trunk. Each of the destination switching units calls a terminal unit. On receiving a response from a terminal, each of the destination switching units connects a line through the mixing trunk.

Thus, a multipoint connection can be realized by specifying a specific local ID as a destination ID only if a plurality of subscribers to be involved in a multipoint connection are entered for a specific local ID in a group data base.

Figure 21:
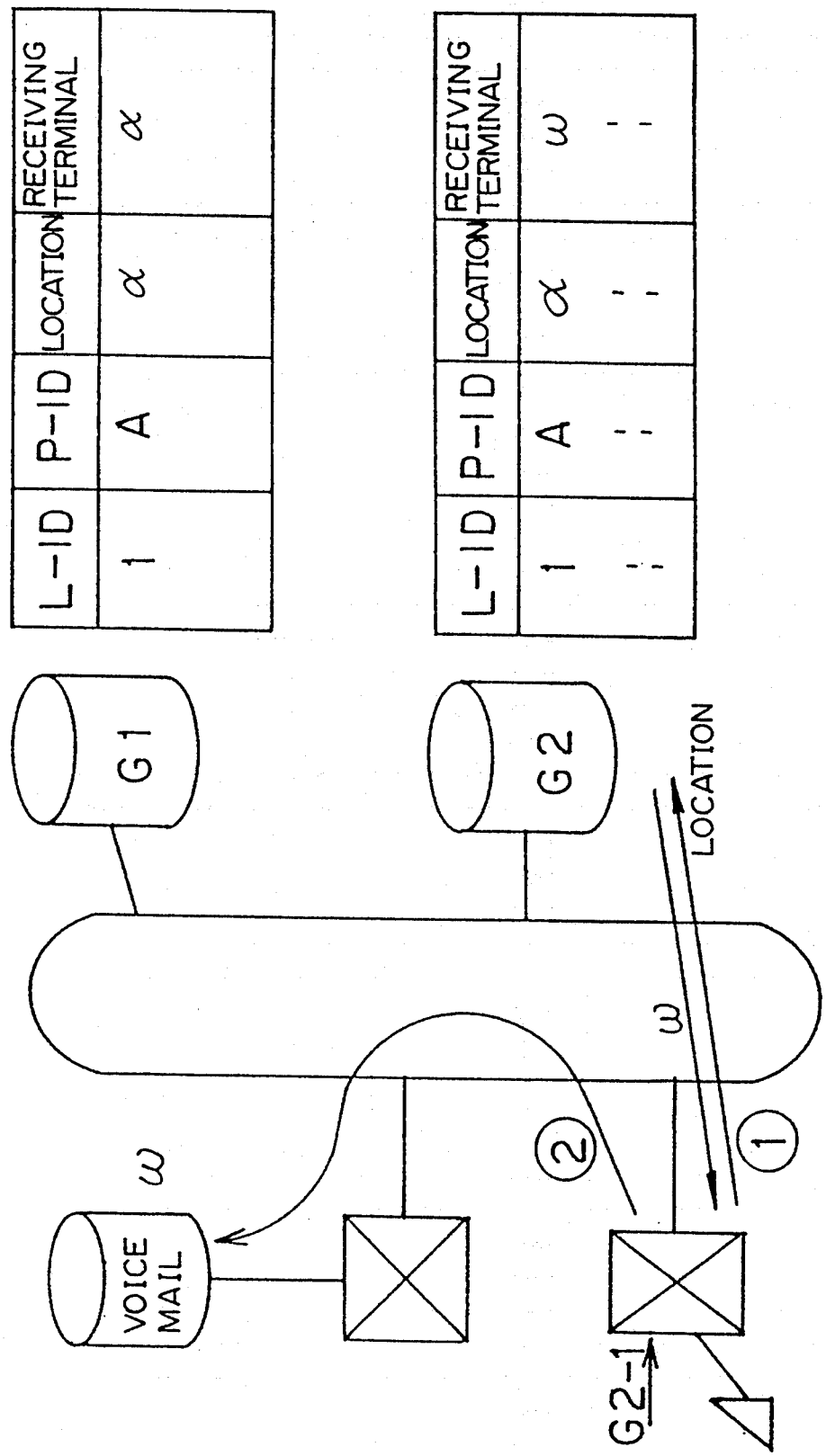
FIG. 21 shows the operation performed when destination subscribers are controlled individually.

Next, explained below by referring to FIG. 21 is the operation performed when a subscriber assigned a personal number and one or more group+local numbers can control a call to him or her to be addressed according to his or her designation separately for each of the numbers.

Assume that subscriber A has entries in group data bases G1 and G2 of the address $\alpha$ of the terminal unit in which subscriber A has an entry of his or her position as the address of the receiving terminal unit having the local ID "1" of group 1, and of the address ω of voice mail as the address of the receiving terminal unit having the local ID "1" of group 2 respectively.

Under the above described conditions, if "G1-1" is specified as a destination ID by the source subscriber, then α is sent by group data base G1 as location information on the local ID "1".

If "G2-1" is specified as a destination ID by the source subscriber, then the address ω of voice mail is sent by group data base G2 as the location information on the local ID "1" (①in FIG. 21). The source switching unit connects a line between the source subscriber and the voice mail (② in FIG. 21) so as to save a message from a source subscriber as a voice mail.

Thus, a call from subscribers in a specific group can be accepted according to the intention of a destination subscriber by separately designating the destination of a call for each of the personal ID and the group ID+local ID, etc. For example, a call can be addressed with a personal ID, a call from other groups can be transmitted to electronic mail, etc.

The above described embodiment realizes the personal communications system based on the personal communication method over an intelligent network according to the present invention. However, it is obvious that the embodiment is not limited to an intelligent network, but can be utilized in other types of networks, for example a public telephone network.

Figure 22:
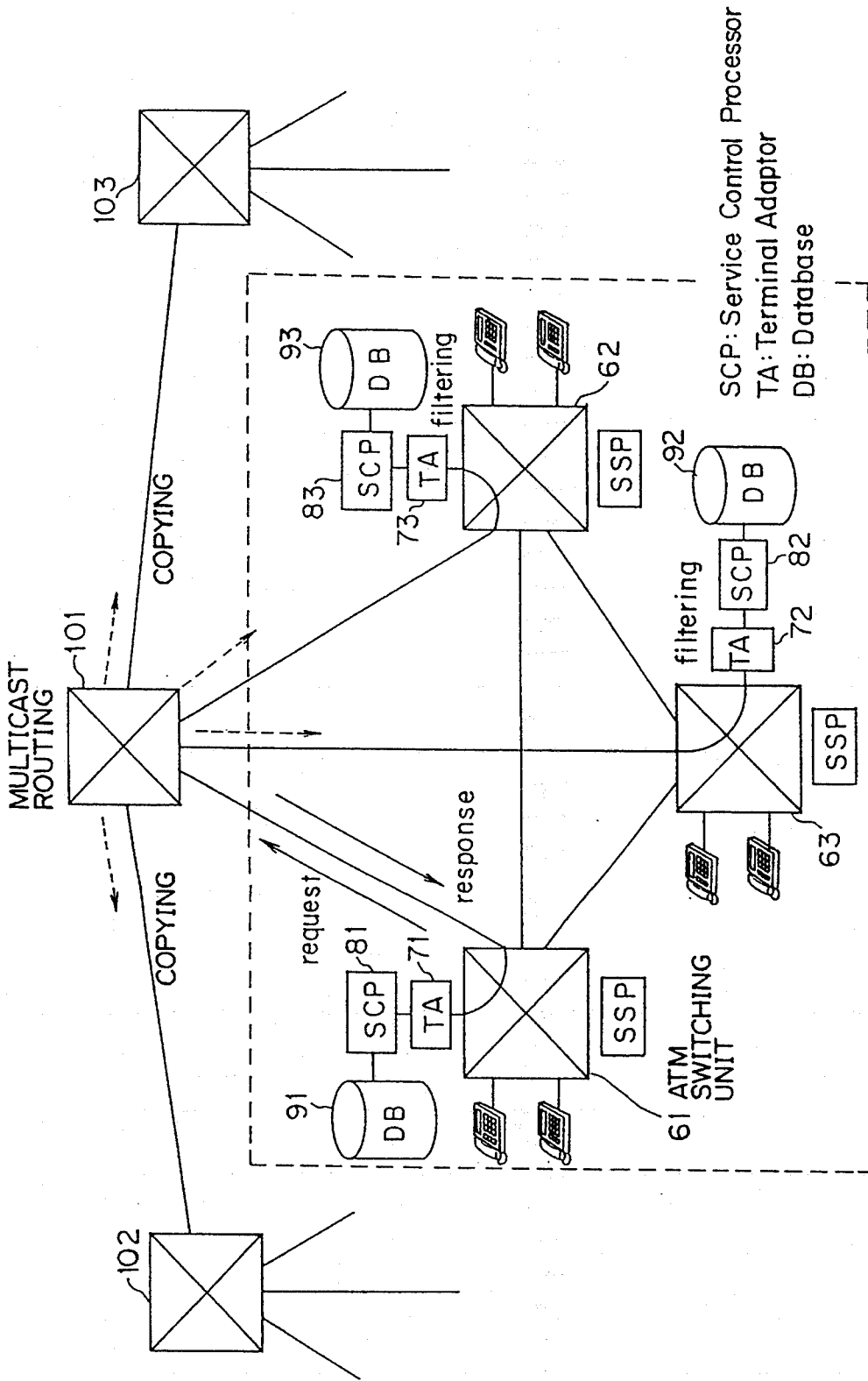
FIG. 22 shows the configuration of the system using an ATM (asynchronous transmission mode).

FIG. 22 shows the configuration of the system in which the personal communications method of the present invention is applied to an ATM switching network. With this system, each of service switching points (SSP) 61, 62, and 63, that is, the ATM switching units, comprises terminal adapters (TA) 71, 72, 73, . . . , service control points 81, 82, 83, . . . , and data bases 91, 92, 93, . . . .

Each of the data bases 91 through 93 corresponds to the above described personal data base or group data base, and stores personal information as associated with each personal ID or group ID+local ID.

If a terminal accommodated in switching unit 61 issues a request for making a call, then switching unit 61 generates an authentication request packet addressed with a source subscriber ID, and sends the packet to upstream switching unit 101. Switching unit 101 copies the authentication request packet, sends it to downstream switching units 62 and 63, and to adjacent switching units 102 and 103. Likewise, switching units 102 and 103 copy the authentication request packet, and sends it to downstream and adjacent switching units.

On receiving the authentication request packet, a switching unit determines according to the terminal adapter provided with an address filtering function whether or not the destination address of the packet matches any of the personal IDs/group IDs stored in a data base connected to the switching unit, and returns the authentication response packet to the source switching unit if the source subscriber ID is stored in the data base.

If the authentication of the source subscriber has been completed, then source switching unit 61 sends to switching unit 101 a packet addressed with the personal ID/group ID of the destination subscriber inputted by the source subscriber. Switching unit 101 copies the packet as described above, and sends it to downstream switching units 62 and 63 and adjacent switching units 102 and 103.

Each of the switching units 62, 63, 102, 103, . . . determines whether or not the destination address of the packet matches any of the IDs stored in the data base connected to the switching unit. If a matching ID exists, then the location information associated with the ID is retrieved and the packet and the retrieved location information are returned to source switching unit 61. On receiving the location information on the destination subscriber, source switching unit 61 performs a routing process according to the location information.

In the above described embodiment, the packet addressed with a source ID and a destination subscriber ID is sent simultaneously to a plurality of switching units over a network when a source subscriber is authenticated or when the location information on a destination subscriber is retrieved, and a corresponding data base retrieves personal information associated with the destination address of the packet and returns it to the source switching unit. Consequently, a real-time calling process can be realized with reduced delay time in connecting a call even when a data base is not centrally managed.

According to the present invention, communications can be established by either a personal number or a group+local number by defining, in addition to a personal number, a group+local number as the number represented by a group number followed by a local number in the group. Furthermore, destination control can be realized such that a call from subscribers of a specific group can be selectively received at the present location of a destination subscriber by specifying a destination address for each group to which the destination subscriber belongs. Additionally, displaying a specified group number as a destination address permits a destination subscriber to be informed, before taking up a receiver, of the group to which the source subscriber of the present call belongs. Besides, various communications services can be provided. For example, a specific local number can be called by a broadcast within a group and assigned to a specific communications service such as a redialing process, etc. Furthermore, a packet containing a personal number or a group+local number is broadcast over a network to retrieve personal information, thereby reducing a connection delay caused by information retrieval.

What is claimed is:

1. A personal communications method for establishing communications based on a personal identifier indicating a personal ID assigned to each subscriber, the method comprising the steps of:

assigning to each subscriber said personal identifier and an additional identifier which is a sum of a group identifier indicating a group to which a subscriber belongs and a local identifier indicating a local ID of said subscriber within said group;

storing, in a personal data base, a location information of the subscriber associated with said personal identifier including an area identifier;

storing, in a group data base, a location information of the subscriber associated with the group identifier and the local identifier;

inputting into a group data base one of the personal identifier and the additional identifier which is a sum of the group identifier and the local identifier, of a destination subscriber;

retrieving location information of the destination subscriber using one of the personal identifier from the personal data base and the additional identifier which is a sum of the group identifier and the local identifier, from the group data base; and establishing communications between a source subscriber and the destination subscriber based on the location information of the destination subscriber.

2. The personal communications method according to claim 1, further comprising the steps of:

authentifying the source subscriber and storing a group identifier of the source subscriber inputted at the authentication of the source subscriber; and sending a call after adding the group identifier of the source subscriber to the local identifier of the destination subscriber inputted by the source subscriber.

3. The personal communications method according to claim 1, further comprising the step of:

specifying a receiving terminal unit of the destination subscriber which receives a call from the source subscriber separately for a personal identifier and the additional identifier which is a sum of the group identifier and the local identifier.

4. The personal communications method according to claim 1, further comprising the step of:

displaying on a receiving terminal unit of a subscriber specified by the destination subscriber to receive a call from the source subscriber, the group identifier specified by the source subscriber.

5. The personal communications method according to claim 1, further comprising the steps of:

assigning a specific local identifier of a group to a communication service including a broadcast call mode, a re-dialing mode and a multi-point connection communication mode; and storing the personal identifier and the location information on a subscriber which is involved in the communication service, each being associated with said specific local identifier.

6. A personal communications method for personal communications system comprising a switching unit connected to a network, a personal data base connected to the switching unit, a group data base connected to the switching unit, and a terminal unit accommodated in the switching unit, the method comprising the steps of:

(a) assigning to each subscriber a personal identifier indicating a personal ID and an additional identifier which is a sum of a group identifier indicating a group to which a subscriber belongs and a local identifier indicating a local ID of said subscriber within said group;

(b) storing a personal information associated with the personal identifier including an area identifier in the personal data base;

(c) storing the personal information associated with the additional identifier in the group data base;

(d) inputting one of the personal identifier and the additional identifier to the terminal unit by a source subscriber;

(e) generating a packet addressed with the inputted personal identifier or the additional identifier;

(f) broadcasting said packet over the network;

(g) determining whether or not a destination address of said packet matches any group identifier stored in the group data base or any area identifier stored in the personal data base;

(h) retrieving the personal information associated with one of the group identifier and the personal identifier which matches said destination address of said packet from one of the group data base and the personal data base, respectively; and (i) returning the personal information to said switching unit accommodating the source subscriber.

7. The personal communications method according to claim 6, wherein:

the additional identifier which is a sum of the group identifier and the local identifier, of a destination subscriber is input in said step (d);

the packet addressed with the additional identifier is generated in said step (e);

it is determined whether or not a destination address of said packet matches any group identifier stored in the group data base in said step (g);

a location information as part of the personal information is retrieved associated with the group identifier which matches said destination address of said packet from the group data base in said step (h); and a second packet provided with the retrieved location information is returned to said switching unit accommodating the source subscriber in said step (i).

8. The personal communications method according to claim 6, further comprising the steps of:

inputting the personal identifier and an address of the terminal unit which is entered as a location of a subscriber at a location entry;

generating a first location entry packet addressed with the personal identifier of said subscriber, inputted at the location entry followed by the address of the terminal unit which is entered as the location of said subscriber;

broadcasting over the network said first location entry packet;

determining whether or not a destination address of said first location entry packet matches any area identifier of one of the personal identifier stored in the personal data base and any group identifier stored in the group data base;

setting the address of the terminal unit added to said first location entry packet as the location information stored in the personal data base containing the area identifier which matches the destination address of said first location entry packet, and determining whether or not the additional identifier is set in addition to the personal identifier;

generating a second location entry packet addressed with the additional identifier if the additional identifier is assigned in addition to the personal identifier having the location entry, and broadcasting over the network said second location entry packet as provided with the address of said terminal unit which is entered as the location of the subscriber;

determining whether or not the destination address of said second location entry packet matches any group identifier stored in the group data base; and setting the address of said terminal unit added to said second location entry packet as the location information on the local identifier associated with said destination address, stored in said group data base storing the group identifier which matches said destination address of said second location entry packet.

9. The personal communications method according to claim 6, comprising the steps of:

assigning a specific local identifier in a group to a broadcast call mode;

storing personal identifiers and location information on a plurality of subscribers to be called by a broadcast as associated with the specific local identifier;

inputting the group identifier of the source subscriber at a location entry and the specific local identifier;

generating a packet addressed with said inputted specific local identifier followed by the group identifier of the source subscriber, and broadcasting said packet over the network;

determining whether or not the destination address of said packet matches any group identifier stored in the group data base;

retrieving the personal identifier and the location information from said group data base storing the group identifier which matches the destination address, as associated with said specific local identifier;

sending another packet provided with said retrieved personal identifier and the location information to said switching unit accommodating the source subscriber; and performing a broadcast call according to the location information on a plurality of destination subscribers of said another packet by sending a call setting request to a switching unit accommodating subscribers to be involved in said broadcast call.

10. The personal communications method according to claim 6, further comprising the steps of:

assigning a specific local identifier of a group to a re-dialing mode, storing the local identifier and a location information on a destination subscriber involved in the latest call as associated with the specific local identifier;

inputting the group identifier of the source subscriber at a location entry and the specific local identifier;

generating a packet addressed with the group identifier of the source subscriber and the specific local identifier, and broadcasting said packet over the network;

determining whether or not a destination address of said packet matches any group identifier stored in the group data base;

retrieving the local identifier and the location information, stored as associated with the specific local identifier, on the destination subscriber involved in the latest call when the destination address of said packet matches the group identifier stored in the group data data base;

sending to said switching unit accommodating the source subscriber a second packet containing the retrieved local identifier and the location information on the destination subscriber; and re-dialing after sending a call setting request to the switching unit accommodating the destination subscriber involved in the latest call according to the location information on said second packet.

11. The personal communications method according to claim 6, further comprising the steps of:

assigning a specific local identifier of the group to a multi-point connection communications mode;

storing the personal identifier and a location information on the destination subscriber to be involved in the multi-point connection communications mode as associated with the specific local identifier;

inputting the group identifier of the source subscriber and the specific local identifier;

generating a packet addressed with the group identifier on the source subscriber and the specific local identifier, and broadcasting said packet over the network;

determining whether or not a destination address of said packet matches any group identifier stored in the group data base;

retrieving the personal identifier and the location information stored in said group data base storing the group identifier which matches said destination address, as associated with said specific local identifier;

sending a second packet provided with said retrieved personal identifier and the location information to said switching unit accommodating the source subscriber;

sending a call setting request to the switching unit accommodating the destination subscriber to be involved in the multi-point connection communications mode through a mixing trunk according to the location information on the destination subscriber; and calling said terminal unit accommodating the destination subscriber according to said location information by said switching unit which has received the call setting request, and connecting a line through the mixing trunk if the terminal unit sends a response.

12. The personal communications method according to claim 6, wherein said switching unit is connected to a ring-type network and comprises a service control point for centrally managing a service controlling function of said switching unit, and said switching unit for switching connections.

13. A personal communications system for establishing communications based on a personal identifier assigned to each subscriber and indicating a personal ID, the system comprising:

a personal data base for storing a personal information as associated with the personal identifier including an area identifier;

a group data base for storing the personal information as associated with an additional identifier which is assigned to each subscriber and is a sum of a group identifier and a local identifier, said group identifier indicating a group to which a subscriber belongs, and said local identifier indicating a local ID of the subscriber within the group;

a first switching unit, connected to a network, for accommodating a source subscriber;

a second switching unit, connected to the network, for managing one of said group data base and said personal data base;

a third switching unit, connected to the network, for accommodating a destination subscriber; and a terminal unit accommodated by one of said first, second and third switching unit, wherein:

said first switching unit broadcasts over the network a packet addressed with one of the personal identifier and the additional identifier when the source subscriber has entered said one of the personal identifier and the additional identifier;

it is determined whether or not a destination address of said packet matches any area identifier of the personal identifier stored in the personal data base or any group identifier stored in the group data base;

the personal information, associated with one of the personal identifier and the additional identifier, which matches the destination address of said packet is retrieved from the personal data base or the group data base; and said second switching unit returns the retrieved personal information to said first switching unit.

14. The personal communication system according to claim 13, wherein:

said first switching unit generates a packet addressed with the additional identifier when the additional identifier of the destination subscriber is inputted by the source subscriber, and broadcasts said packet over the network;

it is determined whether or not a destination address of said packet matches any additional identifier stored in the group data base;

if the group data base stores any additional identifier that matches said destination address of the packet, a location information associated with the additional identifier is retrieved from the group data base; and said second switching unit returns a second packet provided with the retrieved location information to said first switching unit.

15. The personal communication system according to claim 13, wherein:

the switching unit which accommodates said terminal unit for which a location entry has been made generates a first location entry packet addressed with the personal identifier of the subscriber, inputted at a location entry, followed by the address of the terminal unit which is entered as the location of the subscriber, and broadcasts over the network said first location entry packet;

the personal data base and the group data base determine whether or not the destination address of said first location entry packet matches any area identifier of the personal identifier stored in the personal data base or any group identifier stored in the group data base;

the personal data base, which stores the area identifier which matches said destination address of said first location entry packet, sets the address of the terminal unit added to said first location entry packet as the location information stored in the personal data base containing the personal identifier which matches the destination address of said first location entry packet, and determines whether or not the additional identifier is set in addition to said personal identifier;

said second switching unit which manages said personal data base generates a second location entry packet addressed with the additional identifier if the additional identifier is assigned in addition to said personal identifier, and broadcasts over the network said second location entry packet provided with the address of said terminal unit which is entered as the location of the subscriber;

the personal data base and the group data base determine whether or not the destination address of said second location entry packet matches any area identifier of the personal identifier stored in the personal data base or any group identifier stored in the group data base; and the group data base storing the group identifier which matches said destination address enters the terminal address added to said second location entry packet as a location information on the additional identifier which matches the destination address of said second location entry packet.

16. The personal communications system according to claim 13, wherein:

said first switching unit stores the group identifier of said source subscriber inputted at a authentication of the source subscriber, generates a packet addressed with the local identifier of the destination subscriber followed by said stored group identifier of said source subscriber when the local identifier of said destination subscriber is inputted, and broadcasts said packet over the network;

the group data base determines whether or not the destination address of said packet matches any group identifier stored in the group data base;

the group data base storing the group identifier which matches said destination address retrieves a location information associated with said destination address;

said second switching unit which manages said group data base sends a second packet provided with the retrieved location information to said first switching unit; and said first switching unit sends a call setting request to said third switching unit according to the location information on said second packet.

17. The personal communications system according to claim 13, wherein:

a specific local identifier of the group is assigned to a specific communication service including a broadcast call mode, a re-dialing mode and a multi-point connection communication mode, and the personal identifier and a location information on the subscriber to be involved in the specific communication service are stored in said group data base as associated with said specific local identifier;

said first switching unit generates a packet addressed with said specific local identifier followed by the group identifier of the source subscriber inputted at a location entry of the source subscriber when the source subscriber inputs the specific local identifier, and broadcasts said packet over the network;

the group data base determines whether or not the destination address of said packet matches any group identifier stored in the group data base;

the group data base storing the group identifier which matches the destination address retrieves the personal identifier and a location information stored as associated with the specific local identifier;

said second switching unit for managing said group data base sends a second packet provided with said personal identifier and the location information to said switching unit accommodating said source subscriber; and said first switching unit sends a call setting request to said third switching unit which accommodates the subscriber to be involved in the specific communication service according to the location information on said second packet.

18. The personal communications system according to claim 13, wherein:

each of the personal data base and the group data base comprises:

determining means for determining whether or not the destination address of the packet broadcast over the network matches any area identifier of the personal identifier stored in the personal data base or any group identifier stored in the group data base; and detecting means for receiving said packet when a determination result indicates that the destination address matches any area identifier or any group identifier, and for retrieving the personal information associated with the personal identifier or the additional identifier as the destination address of said packet.

19. The personal communications system according to claim 13, wherein said first switching unit is connected to a ring-type network and comprises a service control point for centrally managing a service control function of said first switching unit and said first switching unit for switching connections.

20. A personal communications system for assigning a personal identifier indicating a personal ID to each subscriber, and for establishing communications between a source subscriber and a destination subscriber based on the personal identifier, the system comprising:

a personal data base for storing a personal information associated with the personal identifier including an area identifier;

a group data base for storing the personal information associated with an additional identifier which is a sum of a group identifier and a local identifier, the group identifier indicating a group to which the subscriber belongs, and the local identifier indicates a local ID of the subscriber within the group;

a first switching unit, connected to a layered network, for accommodating a source subscriber;

a second switching unit, connected to the layered network, for managing one of said group data base and said personal data base;

a third switching unit, connected to the layered network, for accommodating a destination subscriber; and a terminal unit accommodated by one of said first, second, and third switching unit, wherein:

said first switching unit generates a packet addressed with one of the personal identifier and the additional identifier of the source subscriber when the source subscriber enters said one of the personal identifier and the additional identifier, and sends said packet to a switching unit in a higher order layer;

said switching unit in the higher order layer copies said packet and sends a copied packet to switching units in a higher order layer, a lower order layer, and adjacent layers;

said third switching unit which receives said packet determines whether or not a destination address of said packet matches any area identifier of the personal identifier stored in the personal database or any group identifier stored in the group data base; and said third switching unit retrieves the personal information associated with the personal identifier or the additional identifier which matches the destination address of said packet to said first switching unit.

21. The personal communications system according to claim 20, wherein:

said first switching unit generates the packet addressed with one of said personal identifier and said additional identifier when said source subscriber enters said one of the personal identifier and the additional identifier of the destination subscriber, and sends said packet to said switching units in the higher order and adjacent layers;

said switching unit in the higher order layer copies said packet and sends a copied packet to said switching units in higher order, lower order, and adjacent layers;

said third switching unit which receives said packet determines whether or not a destination address of said packet matches any area identifier of the personal identifier stored in the personal data base or any group identifier stored in the group data base;

one of said personal data base and said group data base storing the area identifier or the group identifier which matches the destination address of said packet retrieves a location information of the personal information associated with the destination address of said packet; and said third switching unit for managing one of the personal data base and the group data base storing the area identifier or the group identifier which matches the destination address of said packet sends a second packet provided with the location information to said first switching unit.

* * * * *